(12) United States Patent
Elenbaas et al.

(10) Patent No.: US 11,066,148 B2
(45) Date of Patent: Jul. 20, 2021

(54) FOLDING WING HINGE, AIRCRAFT AND METHOD THEREFOR

(71) Applicant: The Boeing Company, Chicago, IL (US)

(72) Inventors: Matthew S. Elenbaas, Mukilteo, WA (US); Renato Felicio, Mukilteo, WA (US); Eric Gruner, Seattle, WA (US); Eric S. Kamila, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 467 days.

(21) Appl. No.: 16/056,126

(22) Filed: Aug. 6, 2018

(65) Prior Publication Data

US 2020/0039631 A1     Feb. 6, 2020

(51) Int. Cl.
*B64C 3/56*     (2006.01)
*B64C 3/42*     (2006.01)

(52) U.S. Cl.
CPC . *B64C 3/56* (2013.01); *B64C 3/42* (2013.01)

(58) Field of Classification Search
CPC ......... Y02T 50/10; B64C 3/56; B64C 23/072; B64C 13/34; B64C 23/076; B64C 3/42; B64F 5/00
See application file for complete search history.

(56) References Cited

U.S. PATENT DOCUMENTS

| 2,881,994 | A | * | 4/1959 | Harold | B64C 3/26 244/124 |
| 3,030,052 | A | | 4/1962 | Grudin | |
| 3,081,053 | A | * | 3/1963 | Jarrell | B64C 3/56 244/49 |
| 4,778,129 | A | | 10/1988 | Byford | |
| 4,979,700 | A | * | 12/1990 | Tiedeman | B64C 13/34 244/99.2 |
| 5,201,479 | A | * | 4/1993 | Renzelmann | B64C 3/56 244/49 |

(Continued)

FOREIGN PATENT DOCUMENTS

| EP | 2496471 | 9/2012 |
| GB | 2299562 | 10/1996 |

(Continued)

OTHER PUBLICATIONS

European Search Report dated Nov. 13, 2019; European Application No. 19189747.9.

(Continued)

*Primary Examiner* — Assres H Woldemaryam
(74) *Attorney, Agent, or Firm* — Perman & Green LLP

(57) ABSTRACT

A folding wing hinge for a wing having a fixed wing portion and a folding wing portion, the folding wing hinge including a hinge pin including a hinge pin spline and having a first longitudinal axis, an input fitting coupled to one of the fixed wing portion and the folding wing portion, the input fitting including an input fitting spline and a second longitudinal axis, and a spline coupling member having a coupling spline configured to couple with the hinge pin spline and the input fitting spline so that the first longitudinal axis moves relative to the second longitudinal axis by a first predetermined amount of movement.

20 Claims, 18 Drawing Sheets

(56) References Cited

U.S. PATENT DOCUMENTS

| | | | |
|---|---|---|---|
| 5,310,138 A * | 5/1994 | Fitzgibbon | B64C 3/56 244/49 |
| 5,350,135 A | 9/1994 | Renzelmann et al. | |
| 5,381,986 A * | 1/1995 | Smith | B64C 3/56 244/49 |
| 5,452,643 A | 9/1995 | Smith et al. | |
| 5,558,299 A * | 9/1996 | Veile | B64C 3/56 244/49 |
| 6,082,665 A * | 7/2000 | Spitzer | B64C 37/00 244/2 |
| 6,270,039 B1 * | 8/2001 | Linjama | B64C 13/24 244/213 |
| 6,834,835 B1 * | 12/2004 | Knowles | B64C 3/54 244/198 |
| 7,322,545 B2 * | 1/2008 | Sheahan, Jr. | B64C 3/56 244/49 |
| 8,733,692 B2 * | 5/2014 | Kordel | B64C 23/072 244/49 |
| 8,946,607 B2 | 2/2015 | Gettinger | |
| 9,045,217 B2 | 6/2015 | Kordel et al. | |
| 9,047,771 B1 | 6/2015 | Thoreen et al. | |
| 9,211,946 B2 | 12/2015 | Good et al. | |
| 9,290,260 B2 | 3/2016 | Lassen et al. | |
| 9,296,469 B2 | 3/2016 | Santini et al. | |
| 9,296,472 B2 | 3/2016 | Thoreen et al. | |
| 9,415,857 B2 | 8/2016 | Fox et al. | |
| 9,440,730 B2 | 9/2016 | Kordel et al. | |
| 9,469,392 B2 | 10/2016 | Fox et al. | |
| 9,481,446 B2 | 11/2016 | Lassen et al. | |
| 9,499,252 B2 | 11/2016 | Lassen et al. | |
| 9,533,758 B2 | 1/2017 | Gettinger | |
| 9,580,166 B2 | 2/2017 | Good et al. | |
| 9,783,284 B2 | 10/2017 | Townsend et al. | |
| 9,873,502 B2 | 1/2018 | Good et al. | |
| 9,908,612 B2 | 3/2018 | Fox | |
| 9,914,523 B2 | 3/2018 | Good et al. | |
| 9,914,524 B2 | 3/2018 | Good et al. | |
| 9,919,809 B2 | 3/2018 | Moy et al. | |
| 9,932,107 B2 | 4/2018 | Good et al. | |
| 9,950,780 B2 | 4/2018 | Santini et al. | |
| 9,950,810 B2 | 4/2018 | Thoreen et al. | |
| 9,957,831 B2 | 5/2018 | Soman et al. | |
| 10,676,175 B2 * | 6/2020 | Moore | B64C 23/069 |
| 2007/0152098 A1 | 7/2007 | Sheahan et al. | |
| 2009/0283639 A1 * | 11/2009 | Ackermann | B64C 3/18 244/131 |
| 2009/0302159 A1 * | 12/2009 | Pajard | B64C 1/26 244/124 |
| 2011/0038576 A1 * | 2/2011 | Thornton | F16C 33/201 384/476 |
| 2011/0180657 A1 * | 7/2011 | Gionta | B64C 3/56 244/49 |
| 2013/0099060 A1 | 4/2013 | Dees et al. | |
| 2013/0320152 A1 | 12/2013 | Parker | |
| 2014/0319268 A1 * | 10/2014 | Lassen | B64C 3/56 244/49 |
| 2015/0014478 A1 * | 1/2015 | Lassen | B64C 3/56 244/49 |
| 2015/0360770 A1 | 12/2015 | Good | |
| 2016/0025146 A1 * | 1/2016 | Saha | B21D 26/14 403/285 |
| 2016/0176504 A1 | 6/2016 | Lassen et al. | |
| 2016/0251073 A1 | 9/2016 | Good et al. | |
| 2016/0362171 A1 | 12/2016 | Lassen et al. | |
| 2017/0066521 A1 | 3/2017 | Fox et al. | |
| 2017/0152017 A1 | 6/2017 | Good et al. | |
| 2017/0321804 A1 | 11/2017 | Soman et al. | |
| 2018/0105256 A1 | 4/2018 | Good et al. | |
| 2018/0148159 A1 | 5/2018 | Good et al. | |

FOREIGN PATENT DOCUMENTS

| | | |
|---|---|---|
| WO | 8902851 | 4/1989 |
| WO | 2011051699 | 5/2011 |

OTHER PUBLICATIONS

Cline, Paul et al.; U.S. Appl. No. 15/656,840, filed Jul. 21, 2017.

Fay, Christopher et al.; U.S. Appl. No. 15/449,303, filed Mar. 3, 2017.

Niemiec, Aaron et al.; U.S. Appl. No. 15/383,873, filed Dec. 19, 2016.

Kamila, Eric et al.; U.S. Appl. No. 15/928,872, filed Mar. 22, 2018.

* cited by examiner

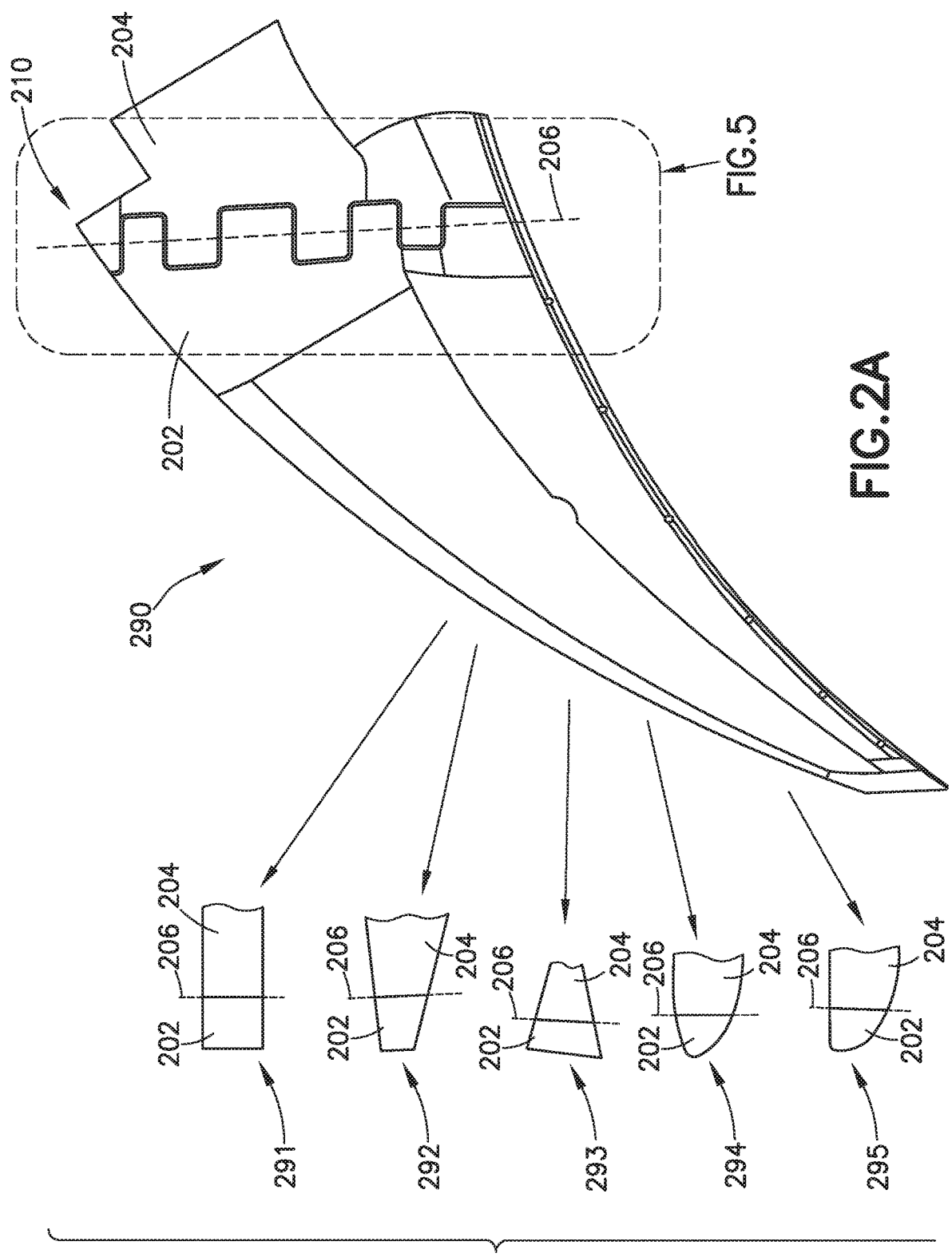

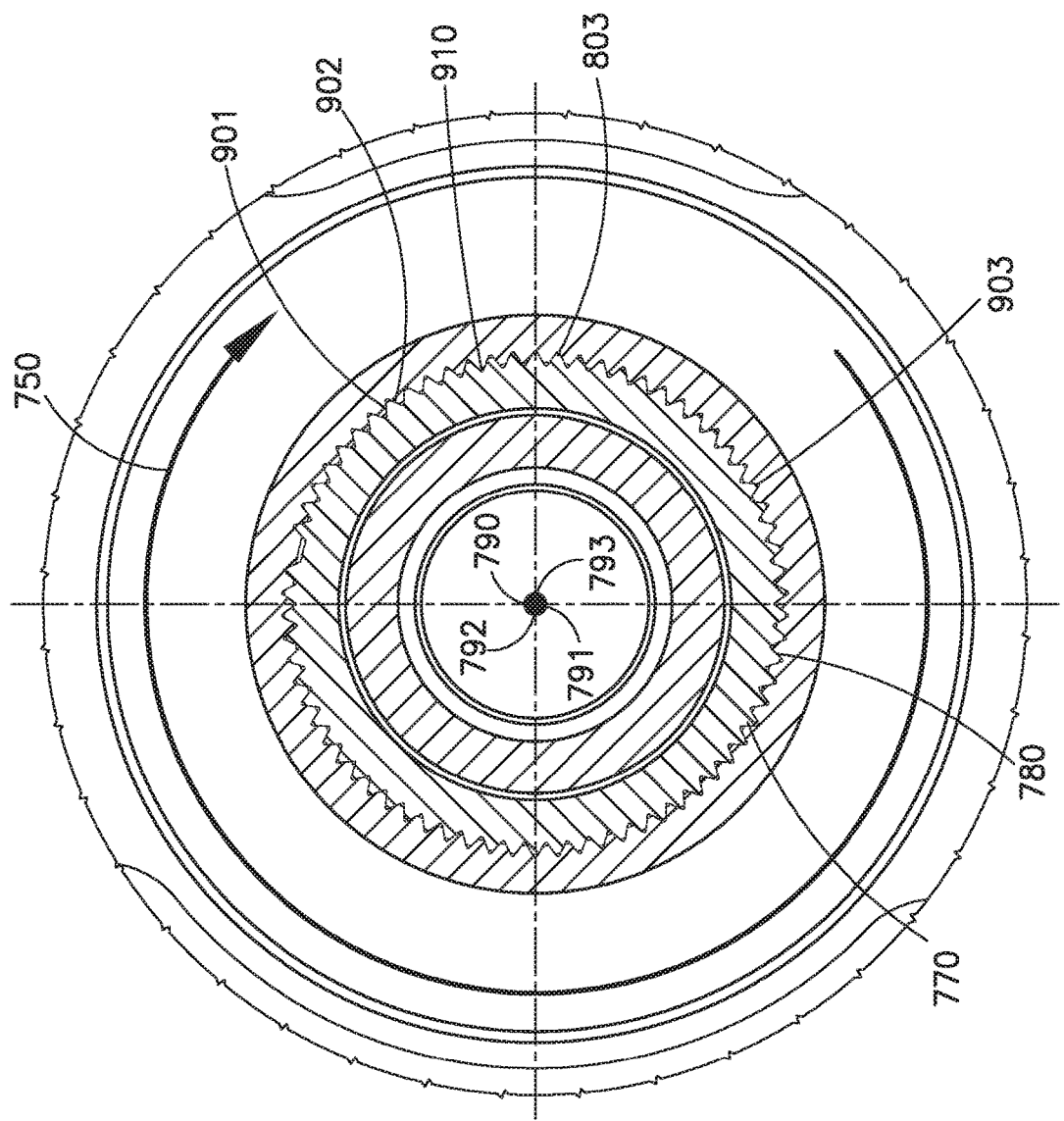
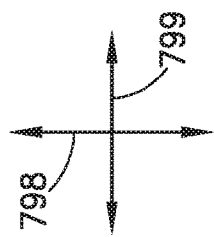
FIG.7B

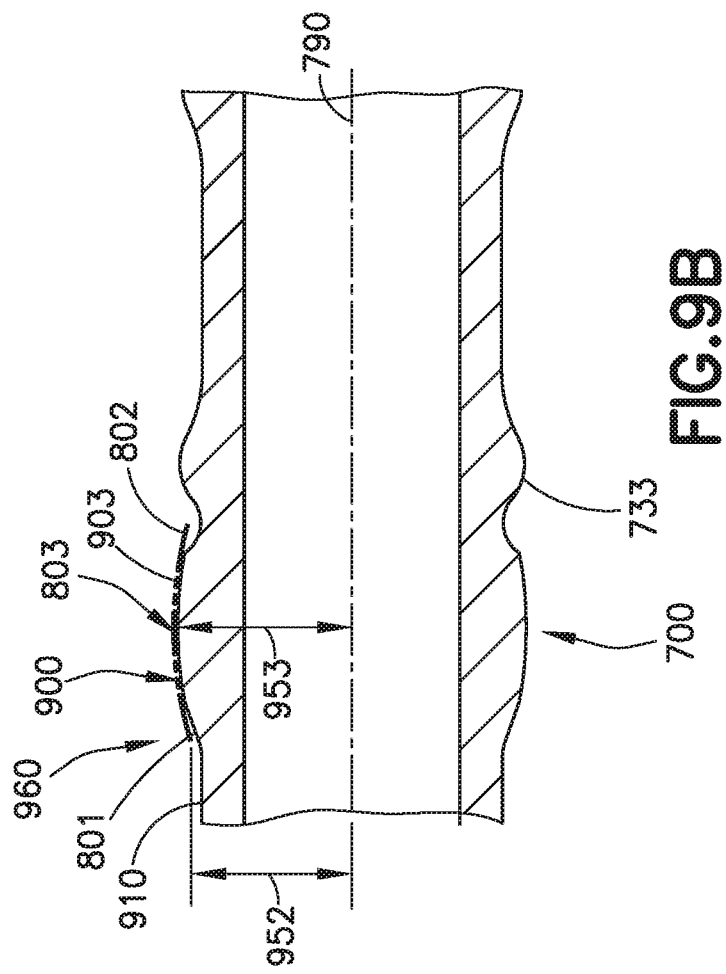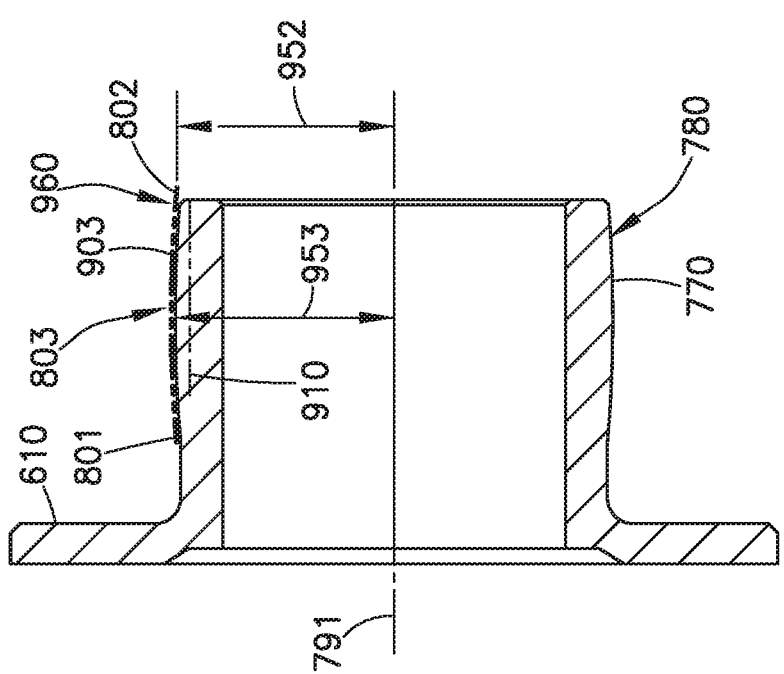

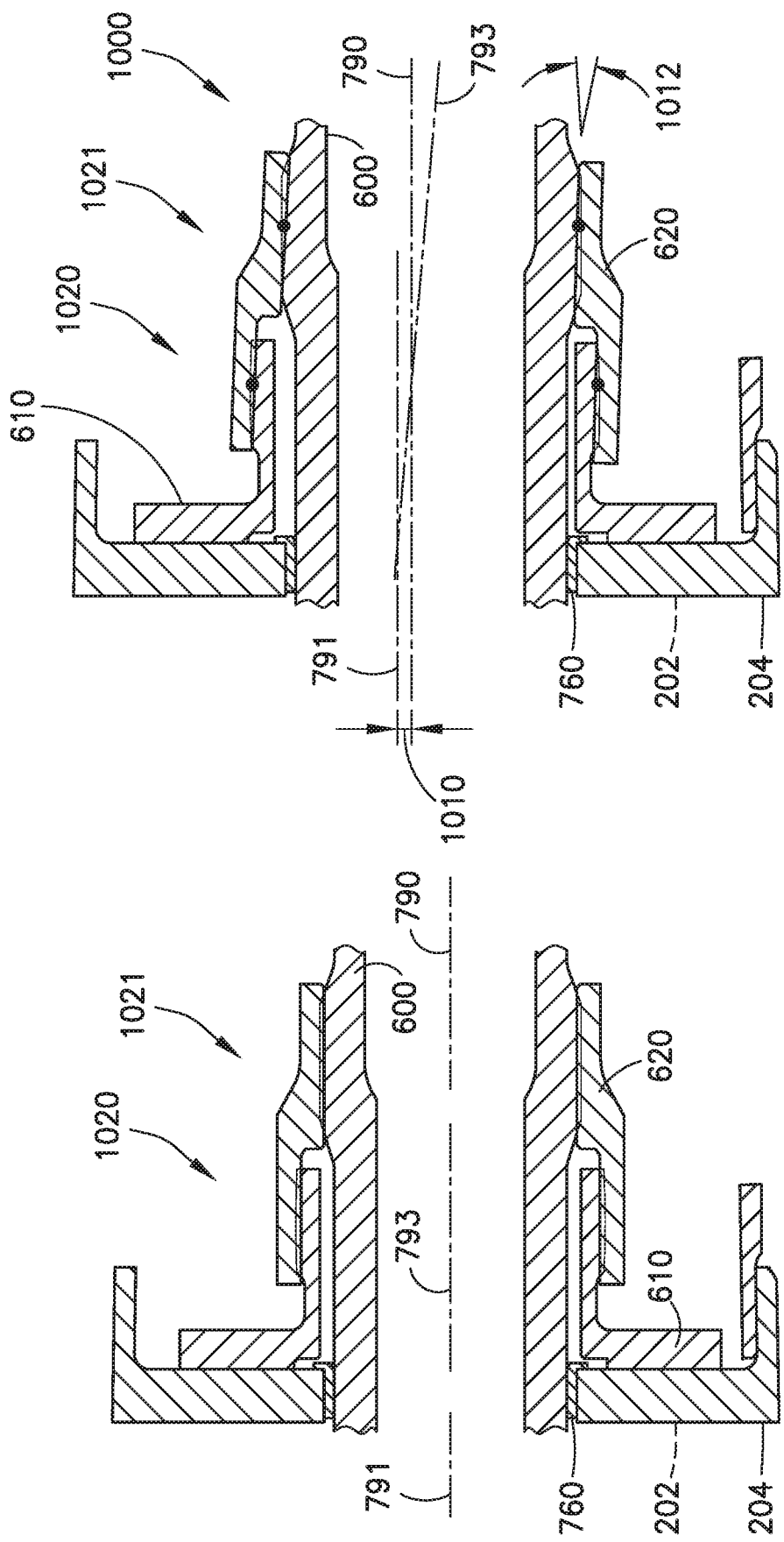

FOLDING WING HINGE, AIRCRAFT AND METHOD THEREFOR

BACKGROUND

1. Field

The exemplary embodiments generally relate to folding wings for aircraft, and more particularly to folding wing hinges.

2. Brief Description of Related Developments

Generally, long span wings are desirable for commercial aircraft to increase aerodynamic efficiency when compared to wings having a shorter span. Increased aerodynamic efficiency reduces fuels consumption and may lead to reduced aircraft operating costs. The wingspan of an aircraft may be limited based on limits and/or regulations imposed by the International Civil Aviation Organization (ICAO), and/or based on physical infrastructure limitations of airports (e.g., the sizes of runways, taxiways, gate areas, hangars, etc.).

Foldable wings may be employed to reduce the wingspan of an aircraft when the aircraft is not in flight (e.g., when the aircraft is taxiing, parked, and/or stored). Such designs commonly include a foldable outboard section (e.g., a folding wing portion) of the wing that is hinged and/or rotatably coupled to an inboard section (e.g. a fixed wing portion) of the wing. The hinged and/or rotatably coupling enables movement of the foldable outboard section relative to the fixed inboard section between an unfolded position (e.g., a flight position) and a folded position (e.g. a stowed position). The foldable outboard section may be moved from the folded position to the unfolded position prior to takeoff of the aircraft to increase the wingspan of the aircraft. The foldable outboard section may conversely be moved from the unfolded position subsequent to landing of the aircraft to decrease the wingspan of the aircraft.

SUMMARY

Accordingly, apparatuses and methods, intended to address at least one or more of the above-identified concerns, would find utility.

The following is a non-exhaustive list of examples, which may or may not be claimed, of the subject matter according to the present disclosure.

One example of the subject matter according to the present disclosure relates to a folding wing hinge for a wing having a fixed wing portion and a folding wing portion, the folding wing hinge comprising: a hinge pin including a hinge pin spline and having a first longitudinal axis; an input fitting coupled to one of the fixed wing portion and the folding wing portion, the input fitting including an input fitting spline and a second longitudinal axis; and a spline coupling member having a coupling spline configured to couple with the hinge pin spline and the input fitting spline so that the first longitudinal axis moves relative to the second longitudinal axis by a first predetermined amount of movement.

Another example of the subject matter according to the present disclosure relates to an aircraft comprising: a folding wing having a fixed wing portion and a folding wing portion; and a folding wing hinge including a hinge pin rotatably coupling the folding wing portion to the fixed wing portion, the hinge pin including a hinge pin spline and having a first longitudinal axis, an input fitting coupled to one of the fixed wing portion and the folding wing portion, the input fitting including an input fitting spline and a second longitudinal axis, and a spline coupling member having a coupling spline configured to couple with the hinge pin spline and the input fitting spline so that the first longitudinal axis moves relative to the second longitudinal axis by a first predetermined amount of movement.

Still another example of the subject matter according to the present disclosure relates to a method for substantially isolating flight loads in a folding wing hinge, the method comprising: providing an input fitting that is coupled to one of a fixed wing portion and a folding wing portion of a wing, wherein the input fitting includes an input fitting spline coupled with a hinge pin spline of a hinge pin; and effecting relative movement between a first longitudinal axis of the hinge pin and a second longitudinal axis of the input fitting with a spline coupling member having a coupling spline configured to couple with the hinge pin spline and the input fitting spline so that the first longitudinal axis moves relative to the second longitudinal axis by a first predetermined amount of movement.

BRIEF DESCRIPTION OF THE DRAWINGS

Figure 1:
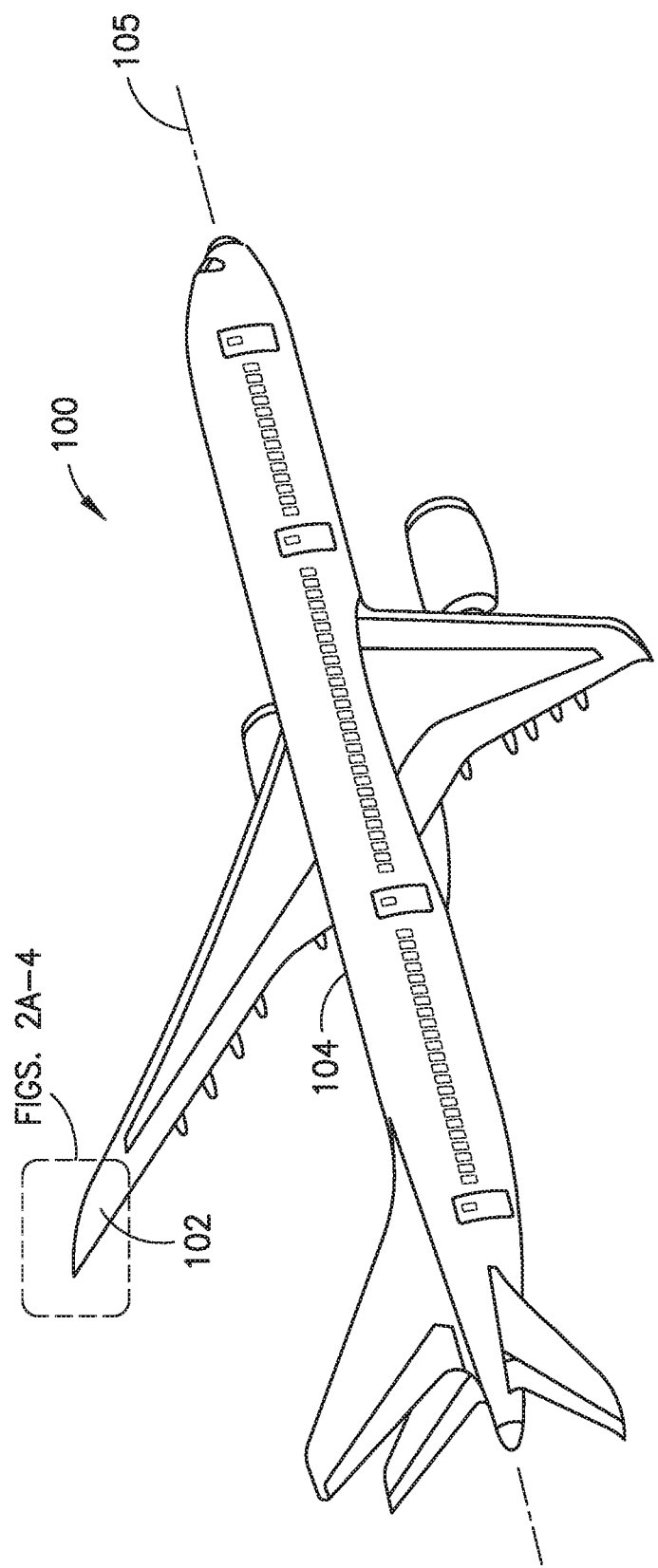
Figure 2C:
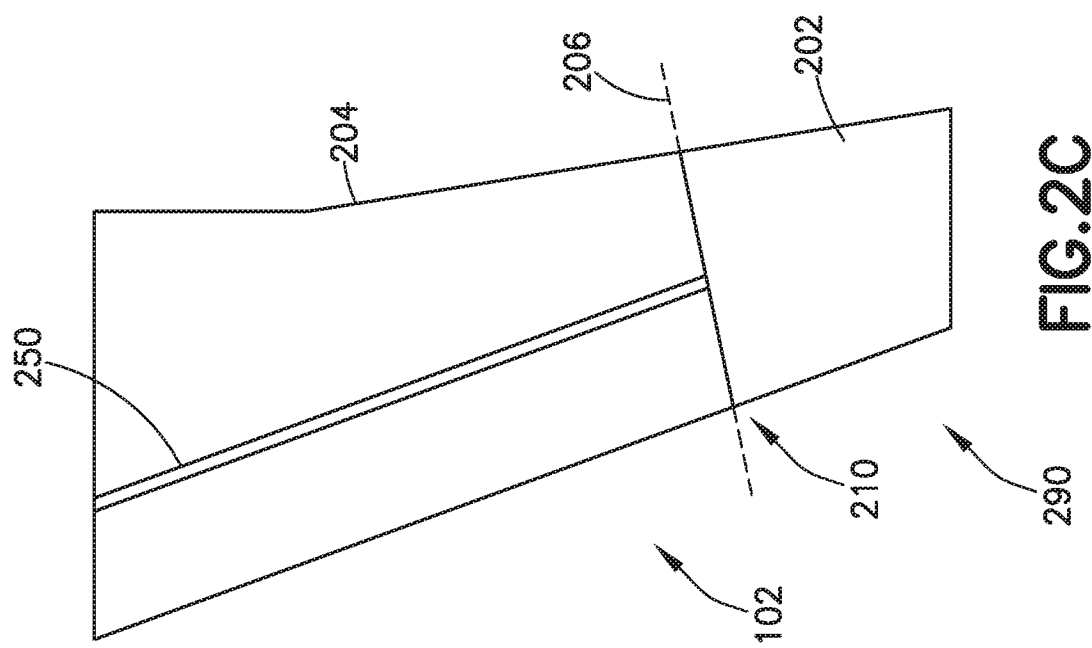
Figure 2B:
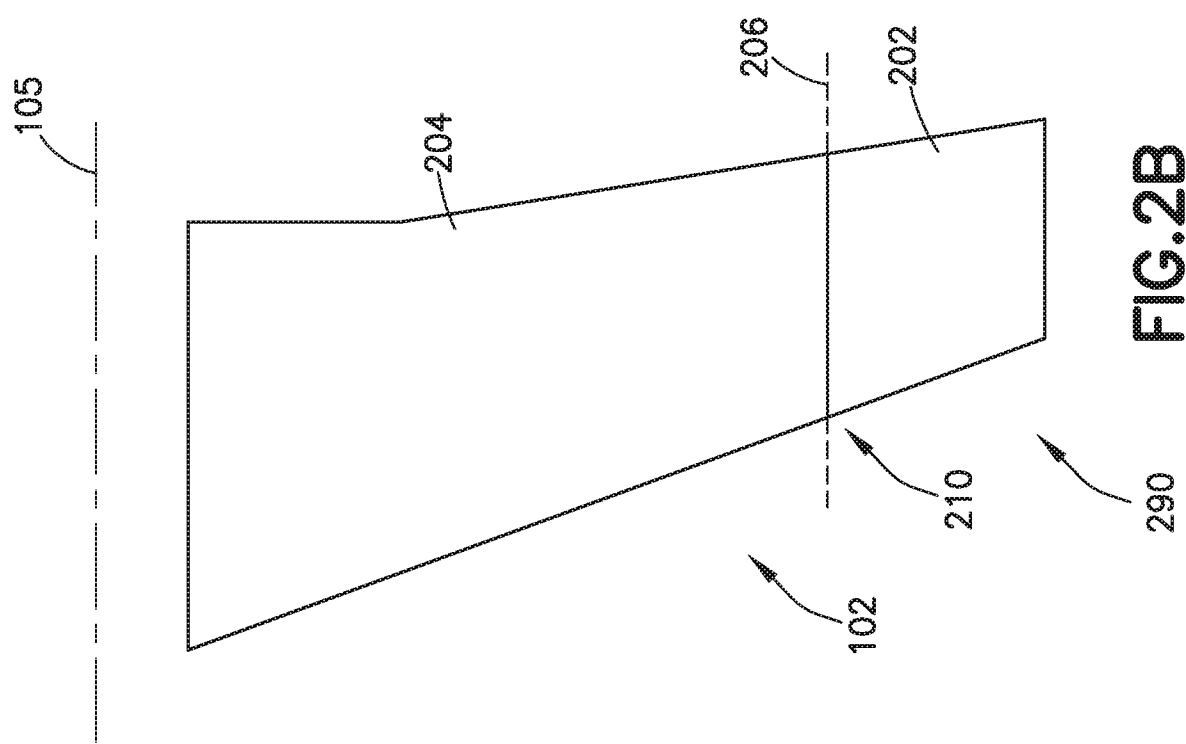
Figure 3:
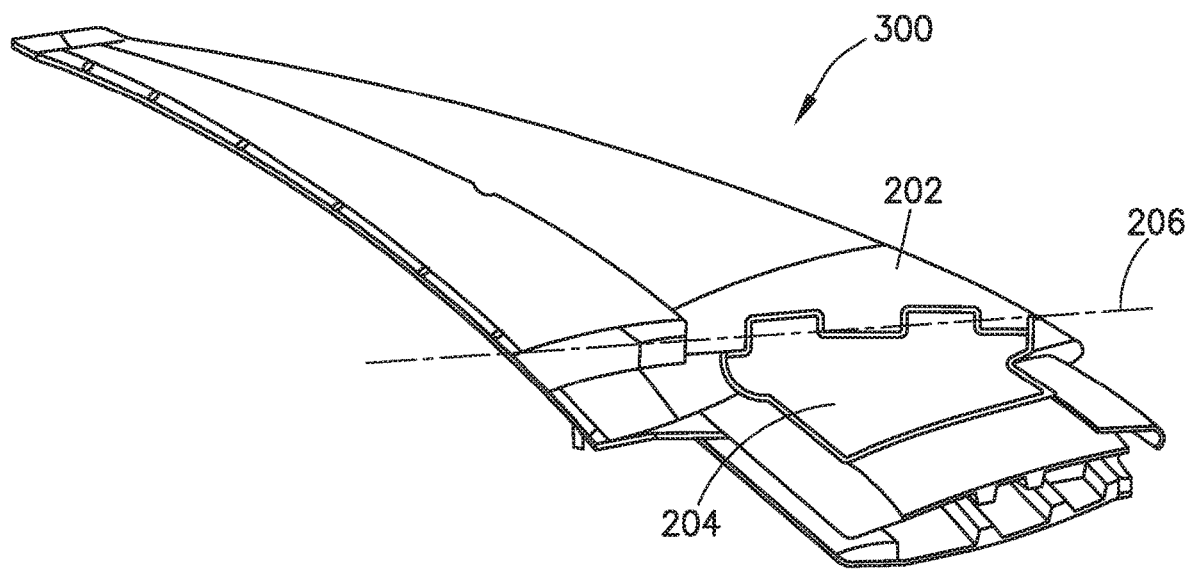
Figure 4:
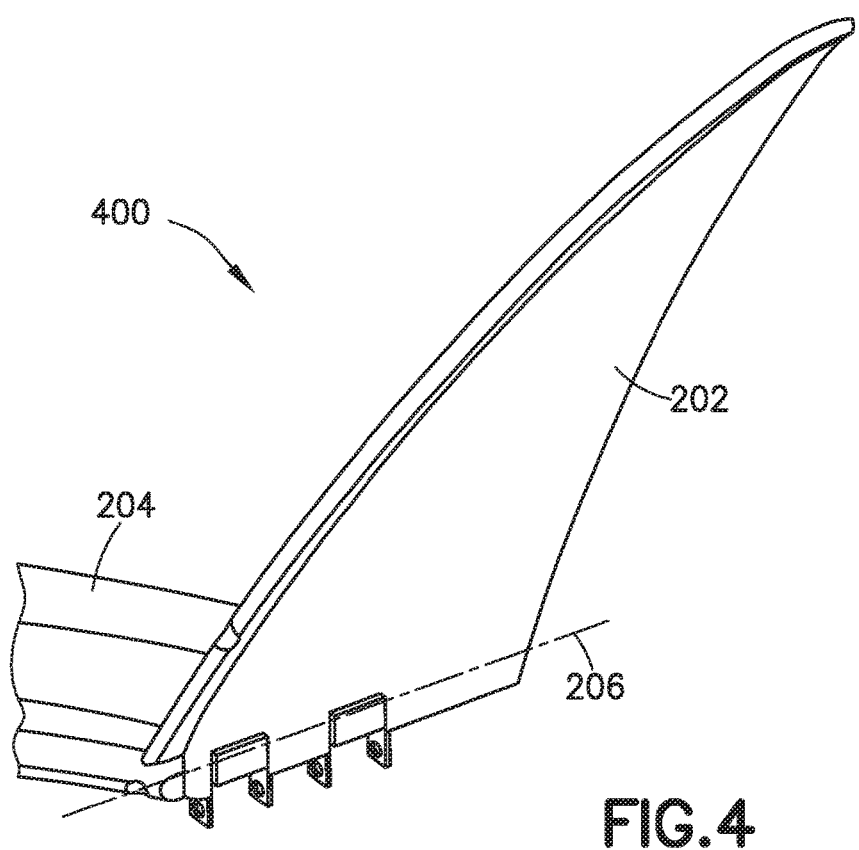
Figure 5:
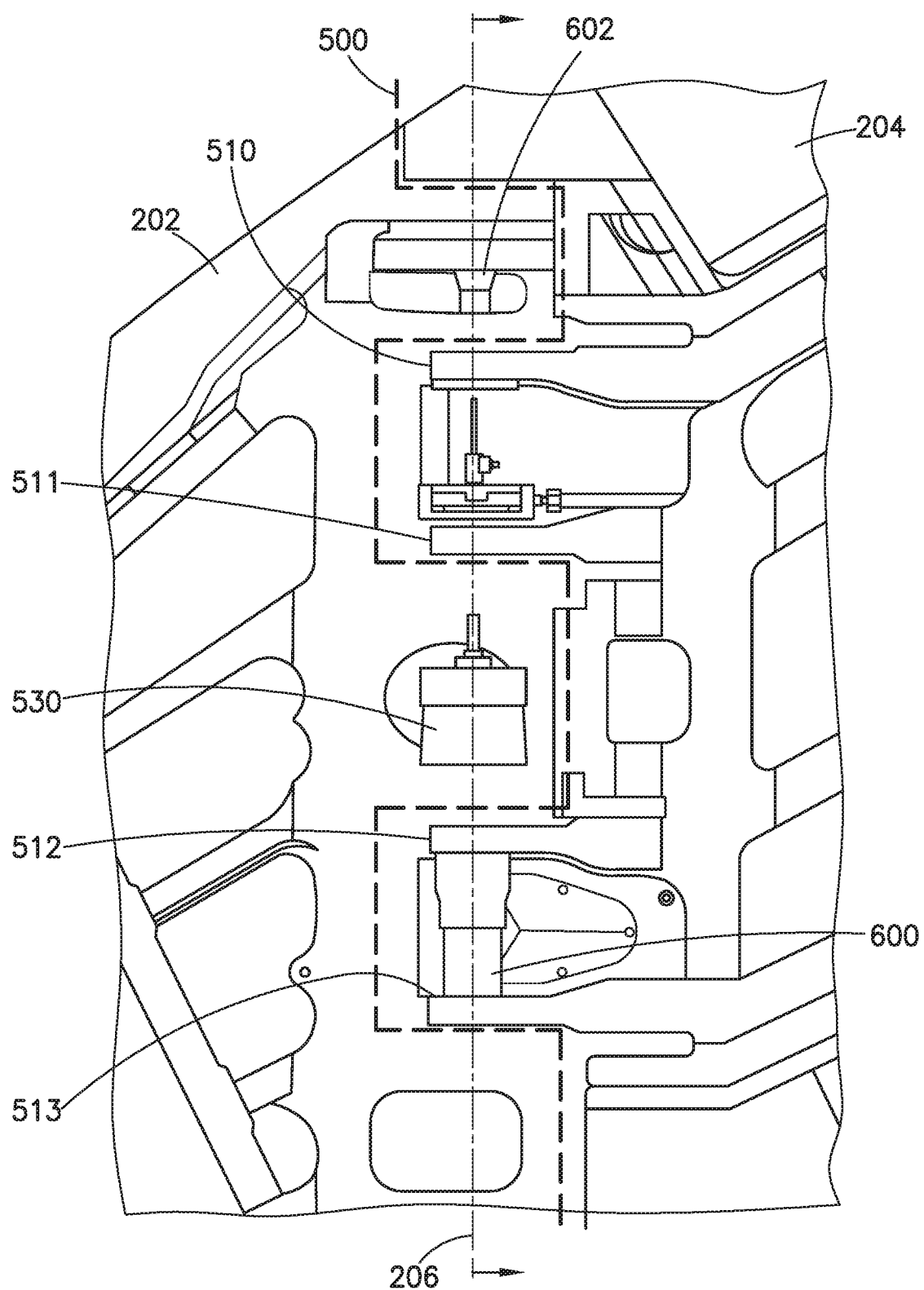
Figure 6A:
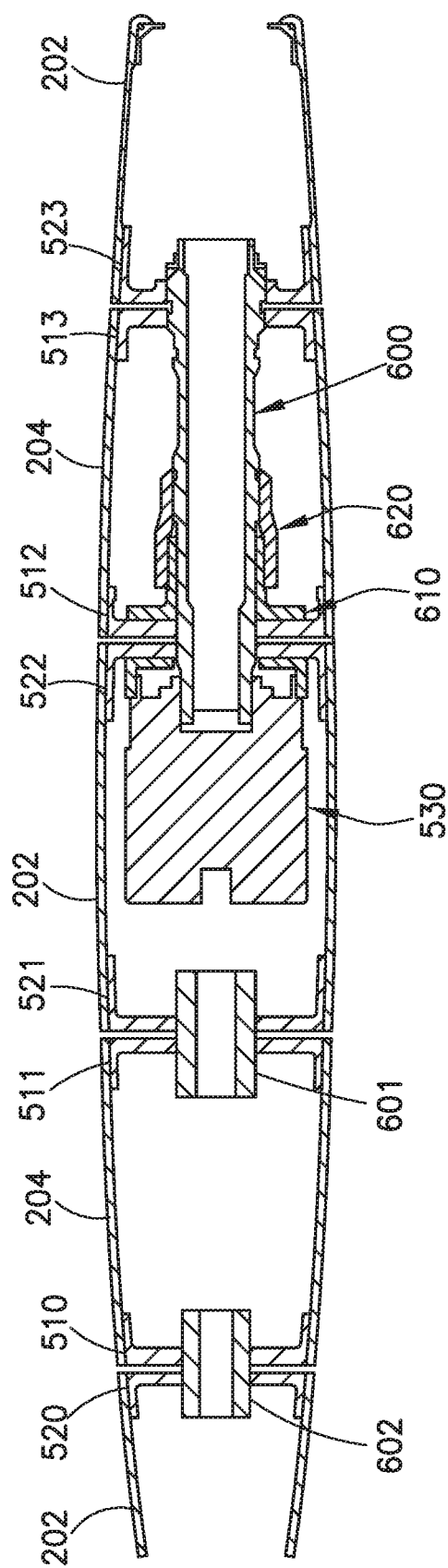
Figure 6B:
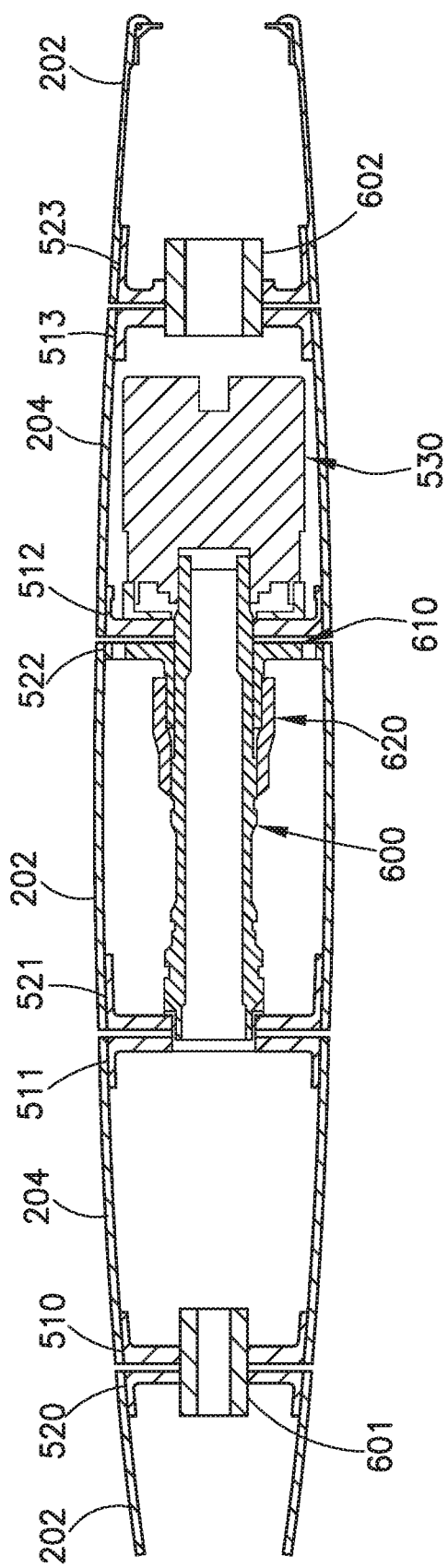
Figure 6C:
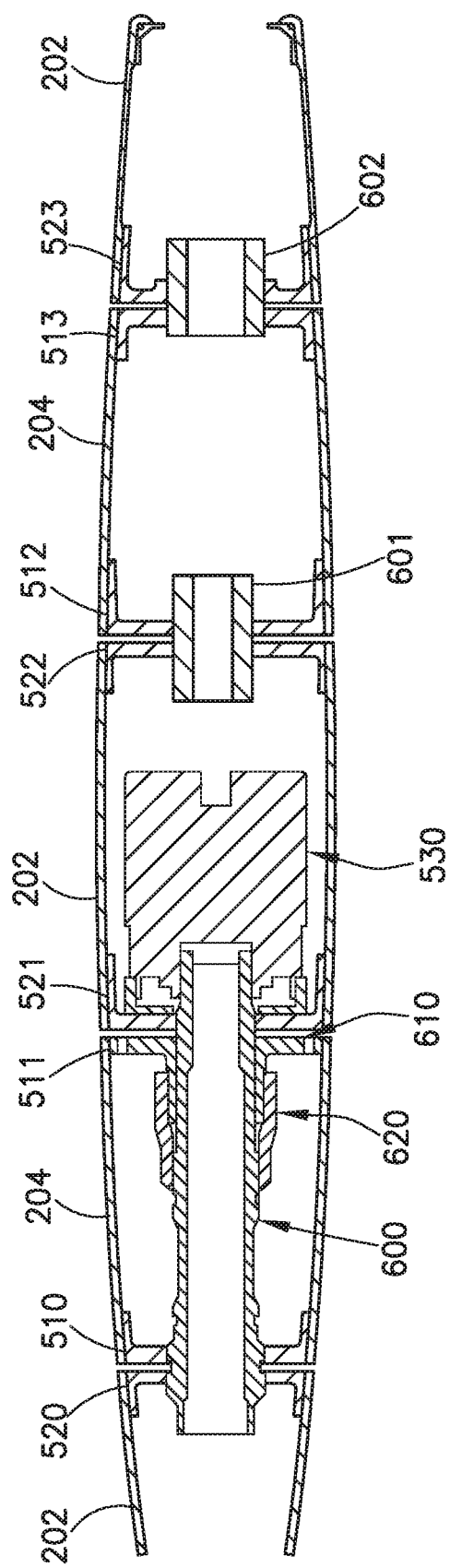
Figure 7A:
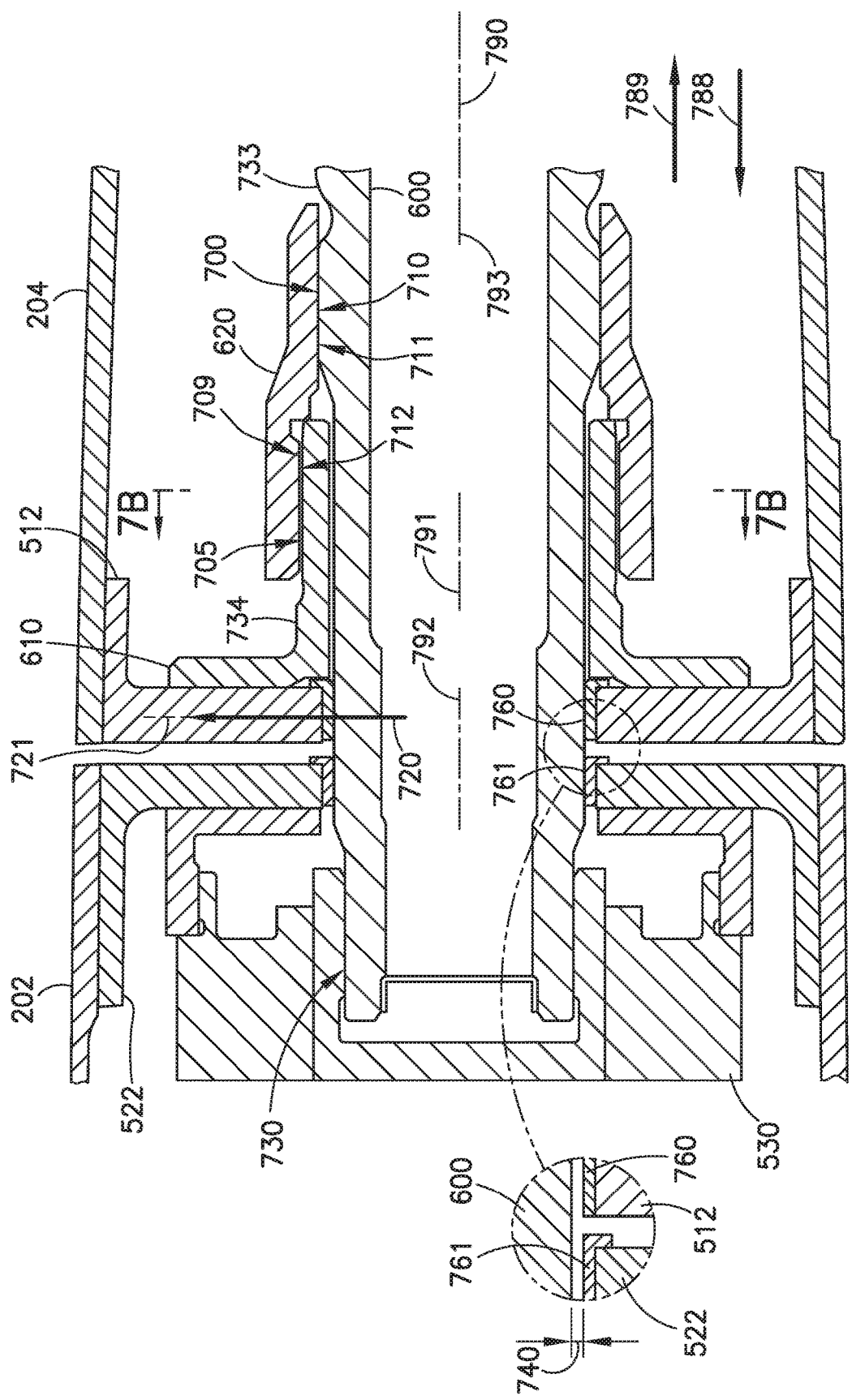
Figure 7C:
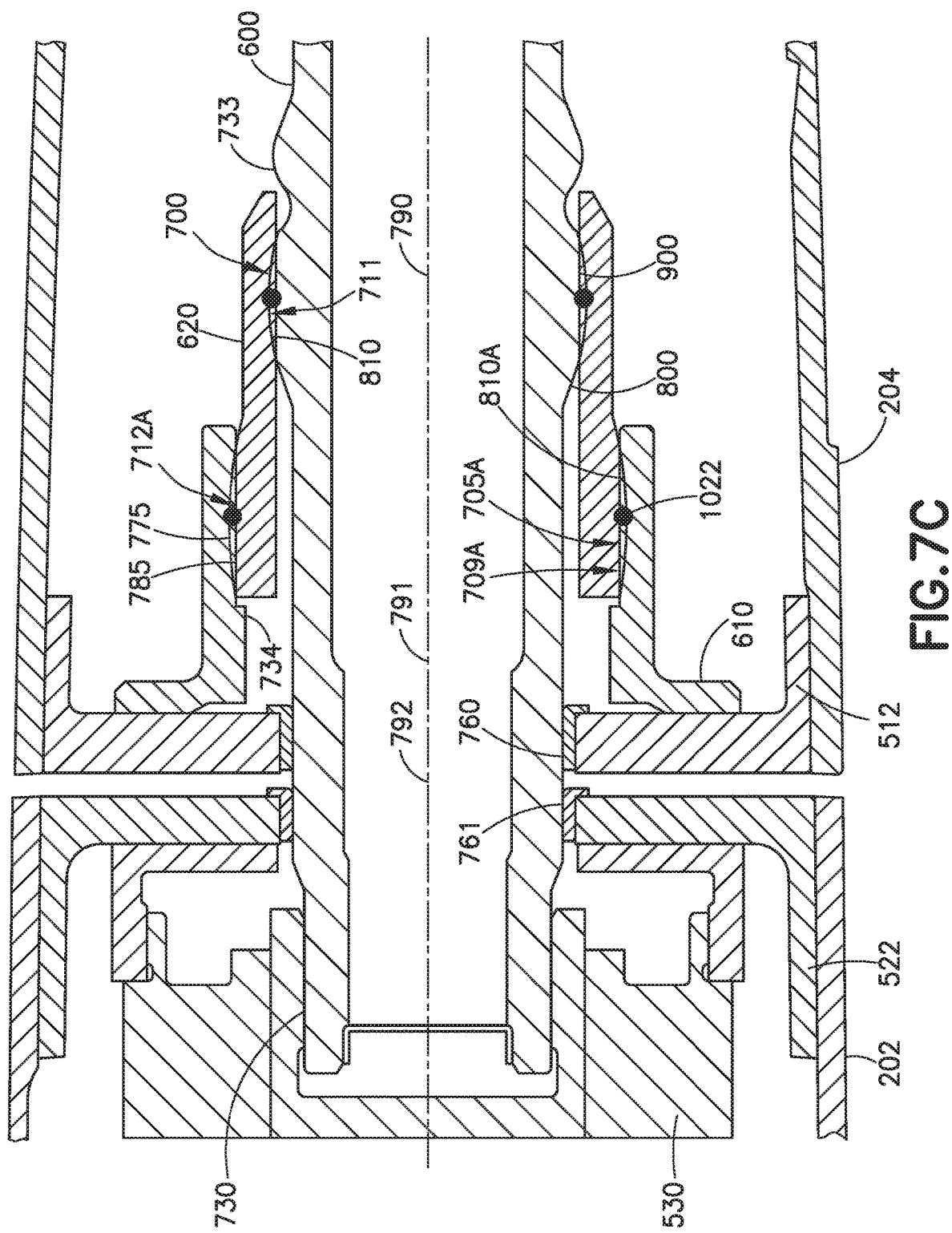
Figure 8A:
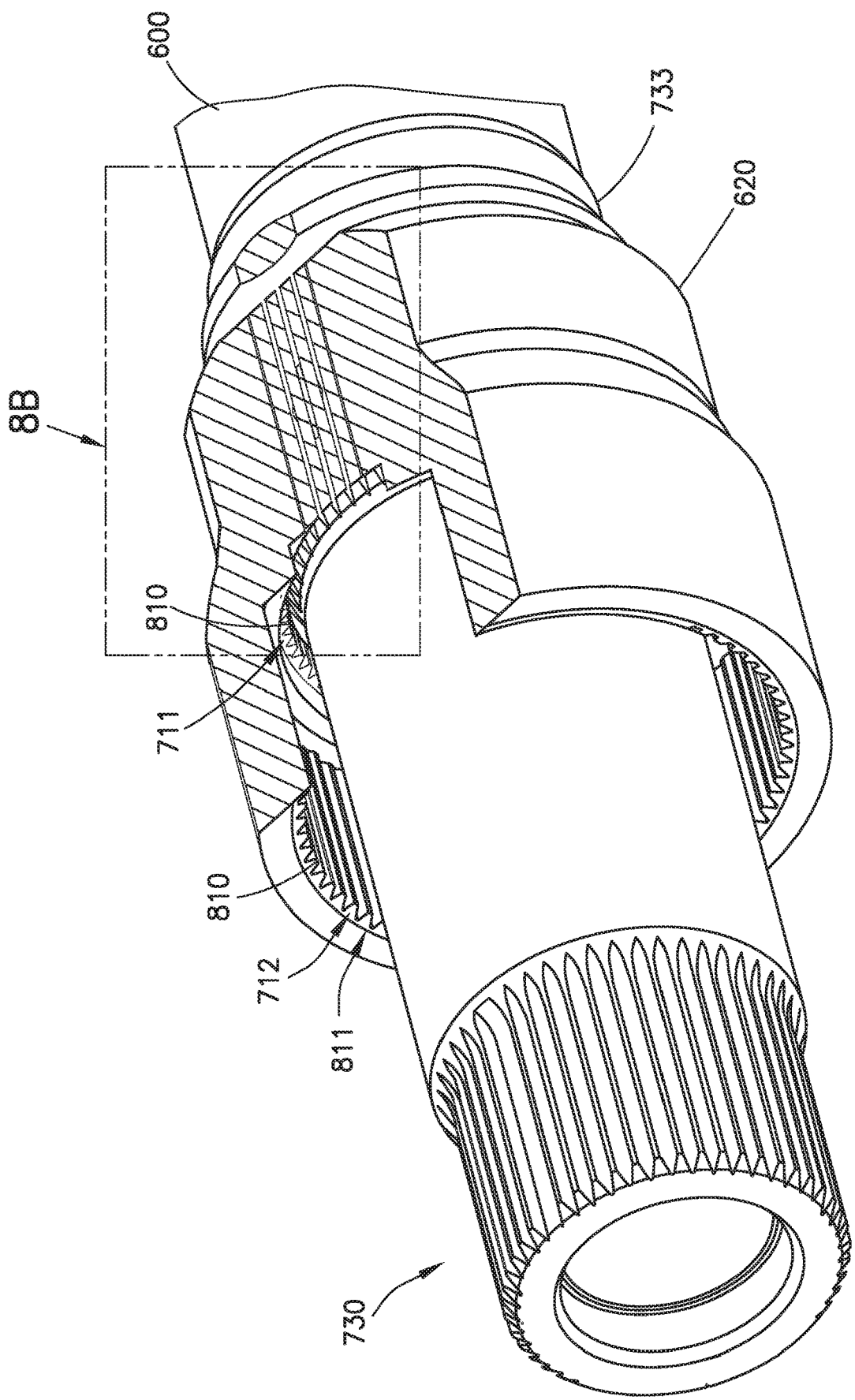
Figure 8B:
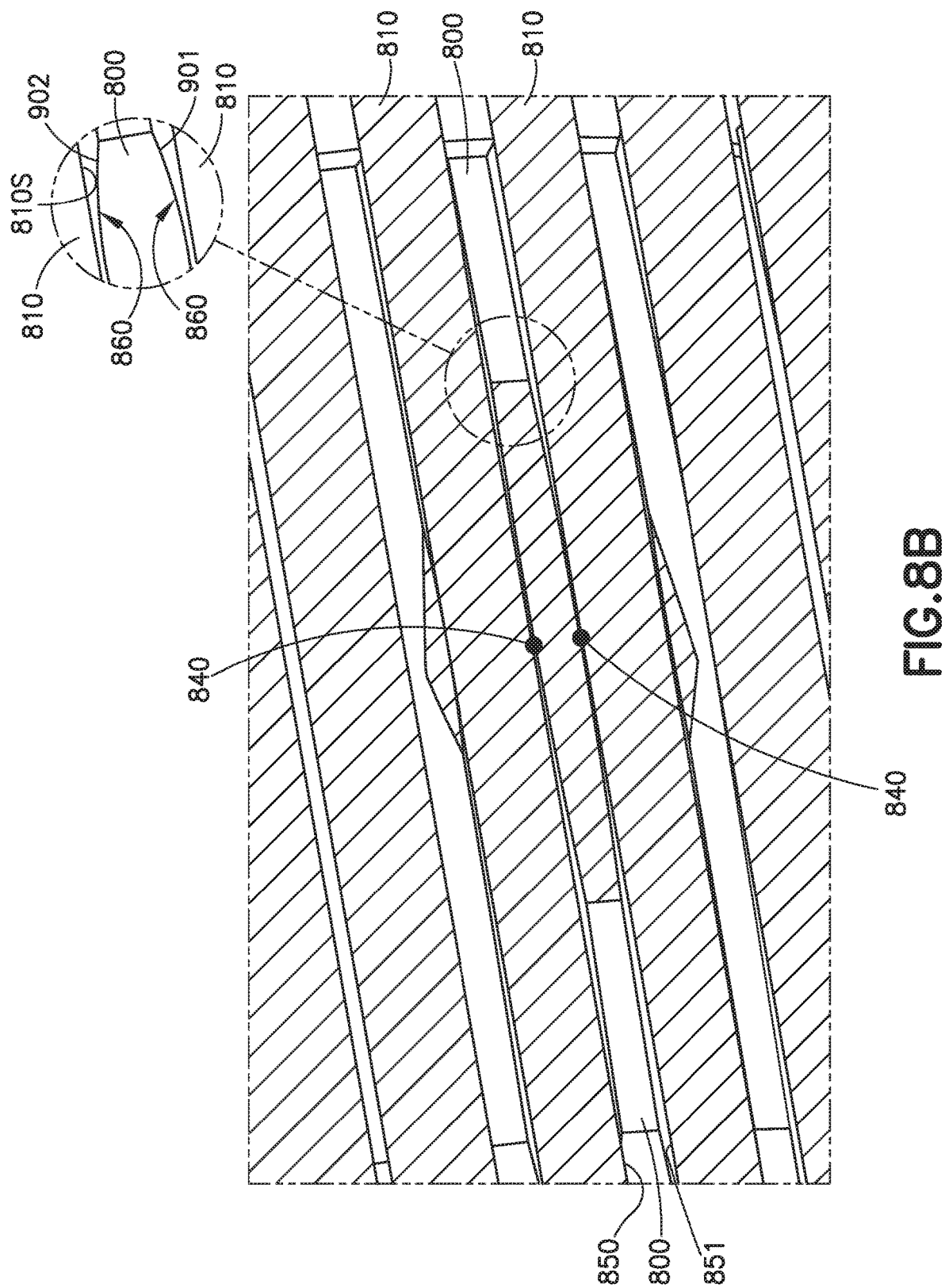
Figure 9C:
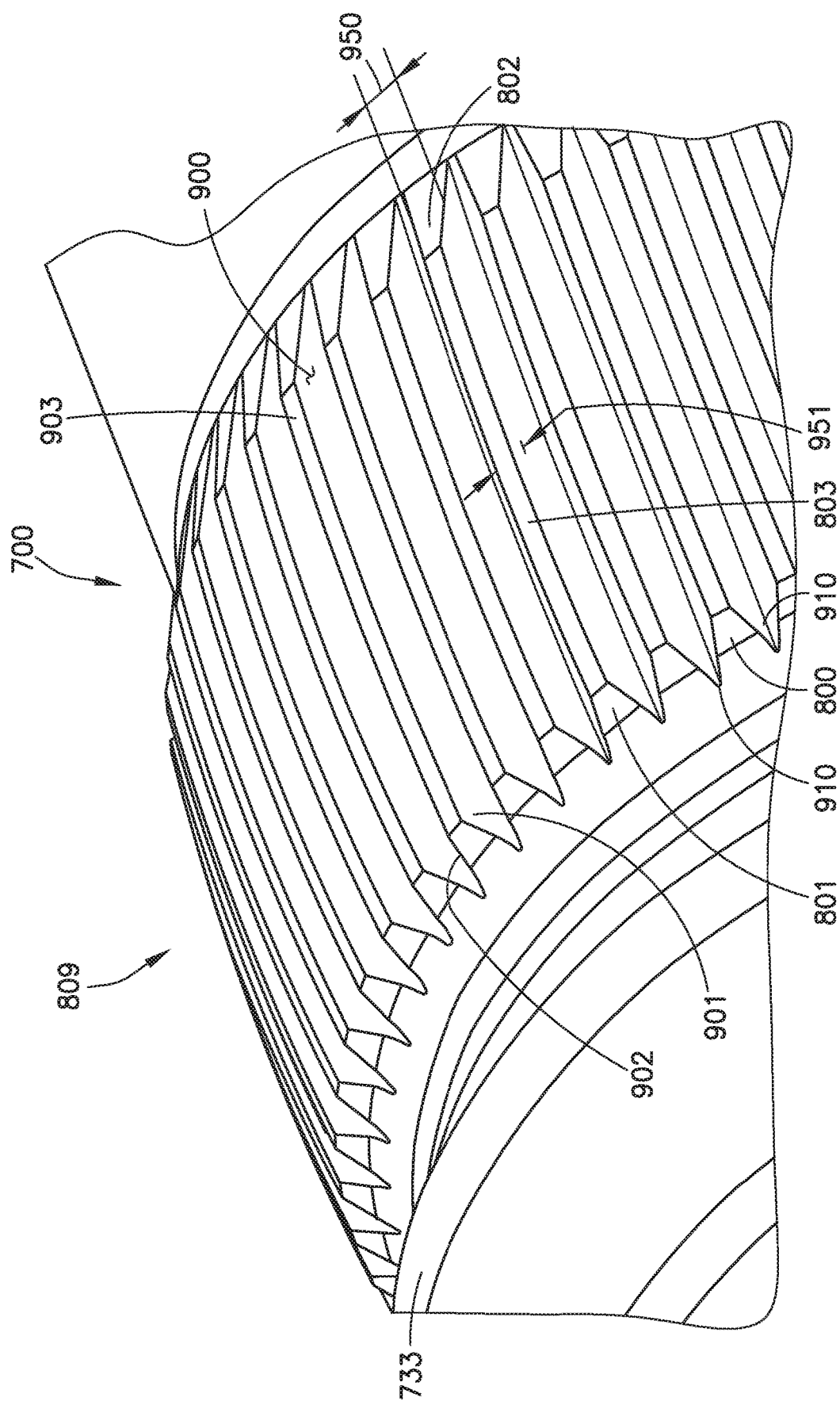
Figure 11:
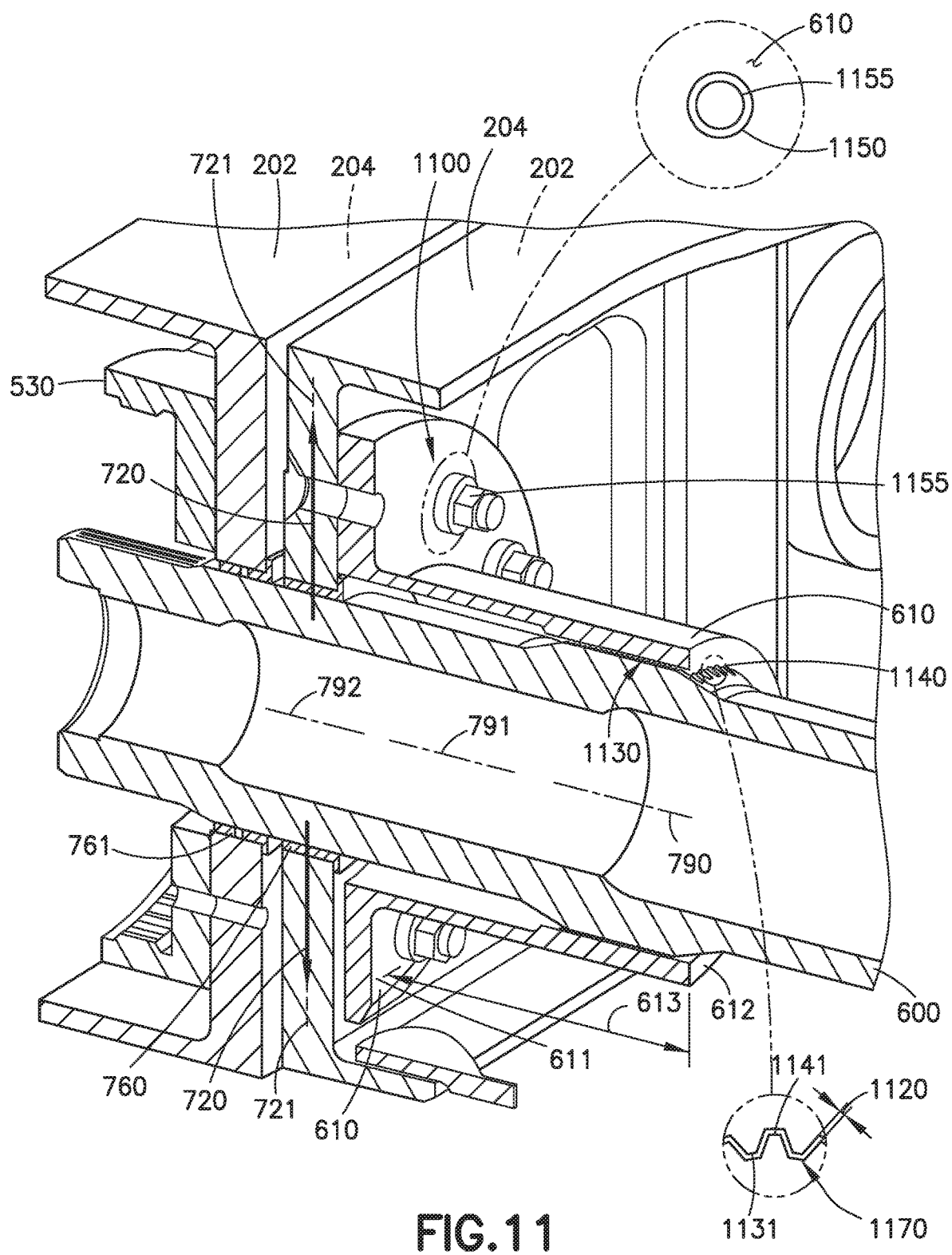
Figure 12:
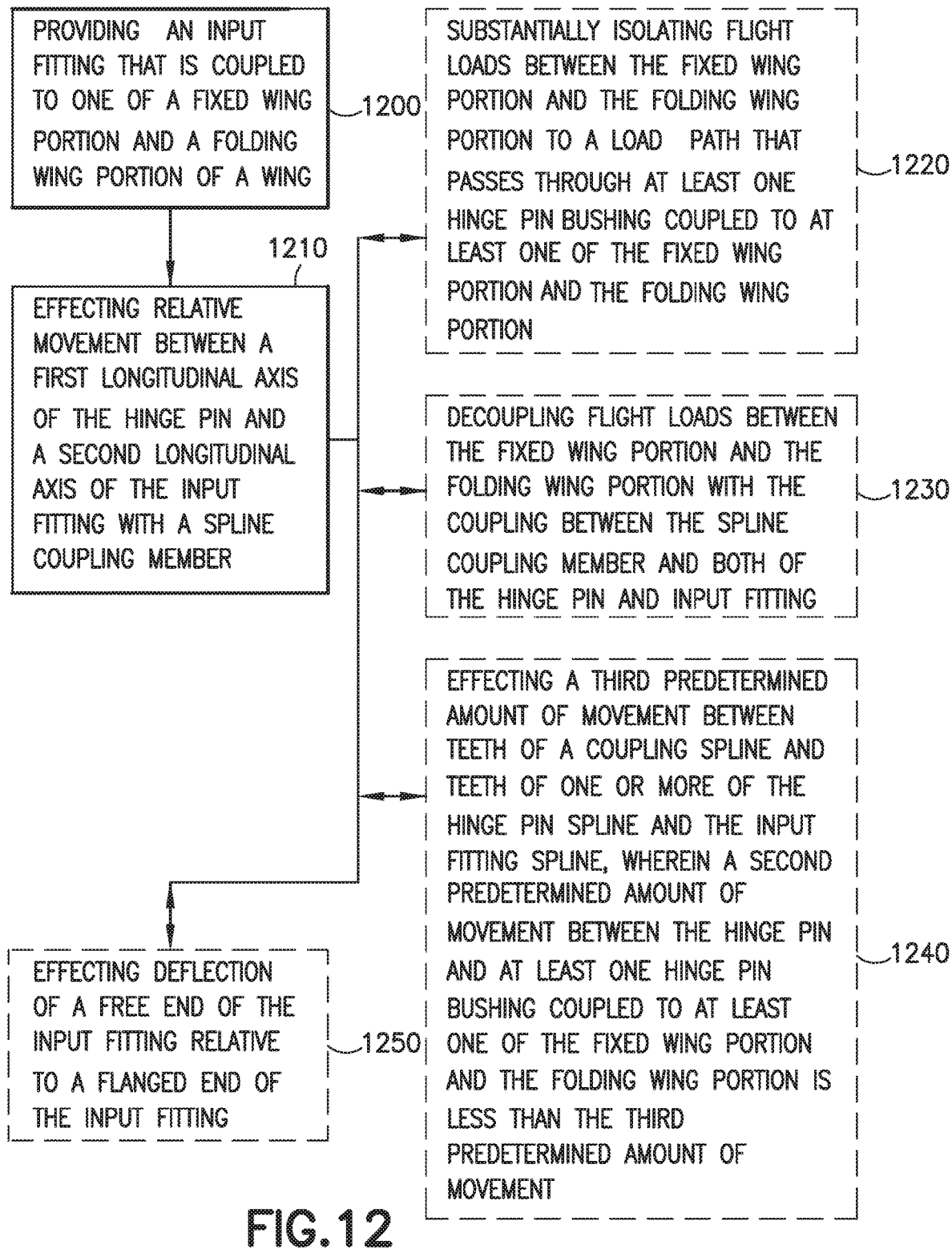

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a perspective view of an aircraft incorporating features in accordance with aspects of the present disclosure;

FIG. 2A is a plan view of a portion of the aircraft of FIG. 1 illustrating a folding wing tip in accordance with aspects of the present disclosure;

FIG. 2B is a plan view of a wing illustrating a hinge line for a folding wing tip that is substantially parallel with a centerline of a fuselage of the aircraft of FIG. 1 in accordance with aspects of the present disclosure;

FIG. 2C is a plan view of a wing illustrating a hinge line for a folding wing tip that is substantially perpendicular to spar of the wing of the aircraft of FIG. 1 in accordance with aspects of the present disclosure;

FIG. 3 is a perspective view of the folding wing tip of FIG. 2A in an unfolded position in accordance with aspects of the present disclosure;

FIG. 4 is a perspective view of the folding wing tip of FIG. 2A in a folded position in accordance with aspects of the present disclosure;

FIG. 5 is a plan view of a portion of the wing of the aircraft of FIG. 1 without the wing skin so as to illustrate hinge pins and rotary actuator of the folding wing tip in accordance with aspects of the present disclosure;

FIG. 6A is a cross-sectional illustration (as identified in FIG. 5) of the wing at the folding wing hinge of the aircraft of FIG. 1 in accordance with aspects of the present disclosure;

FIG. 6B is a cross-sectional illustration (as identified in FIG. 5) of the wing at the folding wing hinge of the aircraft of FIG. 1 in accordance with aspects of the present disclosure;

FIG. 6C is a cross-sectional illustration (as identified in FIG. 5) of the wing at the folding wing hinge of the aircraft of FIG. 1 in accordance with aspects of the present disclosure;

FIG. 7A is a cross-sectional view of a portion of the folding wing hinge of the aircraft of FIG. 1 in accordance with aspects of the present disclosure;

FIG. 7B is a partial cross-section view of the folding wing tip (as identified in FIG. 7A) of the aircraft of FIG. 1 in accordance with aspects of the present disclosure;

FIG. 7C is a cross-sectional view of a portion of the folding wing hinge of the aircraft of FIG. 1 in accordance with aspects of the present disclosure;

FIG. 8A is a perspective view and partial cross-section of spline engagement of a portion of the folding wing hinge of the aircraft of FIG. 1 in accordance with aspects of the present disclosure;

FIG. 8B is a magnified view of a portion of the folding wing hinge identified in FIG. 8A in accordance with aspects of the present disclosure;

FIG. 9A is a cross-sectional illustration of an input fitting of the folding wing hinge of the aircraft of FIG. 1 in accordance with aspects of the present disclosure;

FIG. 9B is a partial cross-sectional illustration of a hinge pin of the folding wing hinge of the aircraft of FIG. 1 in accordance with aspects of the present disclosure;

FIG. 9C is a perspective illustration of a hinge pin spline of the folding wing hinge of the aircraft of FIG. 1 in accordance with aspects of the present disclosure;

FIGS. 10A and 10B are schematic views of a portion of the folding wing hinge of the aircraft of FIG. 1 illustrating hinge pin movement in accordance with aspects of the present disclosure;

FIG. 11 is a perspective cross-sectional illustration of a portion of the folding wing hinge of the aircraft of FIG. 1 in accordance with aspects of the present disclosure; and FIG. 12 is a flow diagram of a method for isolating flight loads in a folding wing hinge of the aircraft of FIG. 1 in accordance with aspects of the present disclosure.

DETAILED DESCRIPTION

Referring to FIGS. 1, 3, 4, and 6A, the aircraft 100 includes a wing 102 having a folding wing portion 202 rotatably coupled to a fixed wing portion 204 by a folding wing hinge 210. The folding wing hinge 210 includes one or more hinge pins 600, 601, 602 installed along a hinge axis 206. In the aspects of the present disclosure the folding wing hinge 210 includes three hinge pins 600, 601, 602 but in other aspects the folding wing hinge 210 may have more or less than three hinge pins. Each of the hinge pins 600, 601, 602 transfer flight loads 720 (see FIG. 7A) from the folding wing portion 202 to the fixed wing portion 204. In addition to transferring the flight loads, at least one of the hinge pins, such as hinge pin 600, reacts or transfers torsional loads 750 (see FIG. 7B) associated with folding and unfolding of the folding wing portion 202 relative to the fixed wing portion 204.

The folding wing hinge 210, in accordance with aspects of the present disclosure, may substantially isolate the flight loads 720 (see FIG. 7A) transferred between the folding wing portion 202 and a fixed wing portion 204 of the wing 102 from torsional loads 750 (see FIG. 7B) associated with folding and unfolding the folding wing portion 202 relative to the fixed wing portion 204. The aspects of the present disclosure may provide for a single hinge pin 600 that reacts or transfers both the flight loads 720 and the torsional loads 750 substantially without a decrease in service life of the hinge pin 600.

Illustrative, non-exhaustive examples, which may or may not be claimed, of the subject matter according to the present disclosure are provided below.

In accordance with aspects of the present disclosure, referring to FIG. 1, the aircraft 100 is illustrated as a commercial passenger aircraft but in other aspects the aircraft 100 may be any suitable aircraft including general aviation aircraft, military aircraft, flying automobiles, or any other aircraft having a portion of a wing that folds as described herein. The aircraft 100 includes a fuselage 104 and a wing 102 coupled to the fuselage 104. Referring also to FIGS. 2A, 2B, 2C, 3, and 4, the wing 102 includes a fixed wing portion 204 that is coupled to the fuselage 104 so as to have a fixed orientation relative to the fuselage 104 (while the fixed wing portion is described as having a fixed orientation relative to the fuselage, in other aspects the fixed wing portion may be a variable sweep wing). The wing 102 also includes a folding wing portion 202 that is rotatably coupled to the fixed wing portion 204 by the folding wing hinge 210 so as to be selectively positioned between an unfolded position 300 (see FIG. 3—(e.g., the flight position)) and a folded position 400 (See FIG. 4—(e.g., the stowed position)). The folding wing portion 202 may have a swept or raked wing configuration 290 (as illustrated in FIGS. 2A-2C), a constant chord configuration 291, a tapered configuration 292, a reverse tapered configuration 293, an elliptical configuration 294, a semi-elliptical configuration 295 or any combination thereof.

In one aspect, the folding wing hinge 210 is coupled to or at least partially formed by the fixed wing portion 204 so that the hinge axis 206 (and longitudinal axis 790 of hinge pin 600 described herein) extends in a direction that is substantially parallel with a centerline 105 of the fuselage 104 (see FIG. 2B); while in other aspects, the folding wing hinge 210 is coupled to or at least partially formed by the fixed wing portion 204 so that the hinge axis 206 (and longitudinal axis 790 of hinge pin 600 described herein) extends in a direction that is substantially perpendicular to the spar 250 of the fixed wing portion 204 (See FIG. 2C). In still other aspects, the hinge axis 206 may have any suitable spatial orientation relative to one or more of the fuselage 104 and fixed wing portion 204.

Referring also to FIGS. 5 and 6A, the folding wing hinge 210 rotatably couples the fixed wing portion 204 to the folding wing portion 202 (the fixed wing portion 204 and the folding wing portion 202 being demarcated by the dashed line 500). The fixed wing portion 204 includes any suitable number of fixed hinge knuckles 510, 511, 512, 513. The folding wing portion 202 includes any suitable corresponding number of folding hinge knuckles 520, 521, 522, 523 that are interdigitated with the fixed hinge knuckles 510, 511, 512, 513. The hinge pins 600, 601, 602 extend through respective ones of the fixed hinge knuckles 510, 511, 512, 513 and the folding hinge knuckles 520, 521, 522, 523 so as to rotatably couple the fixed wing portion 204 and the folding wing portion 202. For exemplary purposes only, hinge pin 602 extends through fixed hinge knuckle 510 and folding hinge knuckle 520, hinge pin 601 extends through fixed hinge knuckle 511 and folding hinge knuckle 521, and hinge pin 600 extends through fixed hinge knuckles 512, 513 and folding hinge knuckles 522, 523. FIG. 6C is substantially similar to FIG. 6A however, in FIG. 6C, hinge pin 602 extends through fixed hinge knuckle 513 and folding hinge knuckle 523, hinge pin 601 extends through fixed hinge knuckle 512 and folding hinge knuckle 522, and hinge pin 600 extends through fixed hinge knuckles 510, 511 and folding hinge knuckles 520, 521. In FIG. 6B, hinge pin 602 extends through fixed hinge knuckle 513 and folding hinge knuckle 523, hinge pin 601 extends through fixed hinge knuckle 510 and folding hinge knuckle 520, and hinge pin 600 extends through fixed hinge knuckles 511, 512 and folding hinge knuckles 521, 522.

Referring to FIGS. 5, 6A, 6C, 7A, and 7B, the hinge pin 600 is fixedly coupled to the fixed wing portion 204, e.g., so that the hinge pin 600 does not rotate relative to the fixed wing portion 204. In FIG. 6B, the hinge pin 600 is fixedly coupled to the folding wing portion 202, otherwise the operation and structure of the folding wing hinge 210 is substantially similar between the aspects illustrated in FIGS. 6A-6C. Here, the folding wing hinge includes the hinge pin 600, an input fitting 610, and a spline coupling member 620, where in FIGS. 6A and 6C the input fitting 610 and spline coupling member 620 non-rotatably couple the hinge pin 600 to, for example, the fixed hinge knuckle 512 of the fixed wing portion 204. In FIG. 6B, the input fitting 610 and spline coupling member 620 non-rotatably couple the hinge pin 600 to, for example, the folding hinge knuckle 522 of the folding wing portion 202. The positions of the hinge pin 600, the input fitting 610, and the spline coupling member 620 (and the rotary actuator 530 coupled to the hinge pin 600) illustrated in FIGS. 6A-6C are exemplary only and in other aspects, the hinge pin 600 may be fixedly coupled to any suitable portion of one of the fixed wing portion 204 and the folding wing portion 202 where the rotary actuator 530 is disposed within (and coupled to) the other one of the fixed wing portion 204 and the folding wing portion 202.

In one aspect, the hinge pin 600 includes a hinge pin spline 700 and a first longitudinal axis 790. The input fitting 610 is coupled to one of the fixed wing portion 204 and the folding wing portion 202. In the aspects illustrated in FIGS. 6A, 6C, and 7A the input fitting 610 is coupled to the fixed wing portion 204; while in other aspects, such as illustrated in FIG. 6B, the input fitting 610 is coupled to the folding wing portion 202. The input fitting 610 includes an input fitting spline 705 and a second longitudinal axis 791. The spline coupling member 620 has a coupling spline 710 configured to couple with the hinge pin spline 700 and the input fitting spline 705 so that the first longitudinal axis 790 moves relative to the second longitudinal axis 791 by a first predetermined amount of movement 1000 (see FIG. 10B), where the amount of movement is a linear distance 1010 and/or an angular rotation 1012 as shown in FIG. 10B. In one aspect, the coupling spline 710 includes a first mating spline portion 711 that couples with the hinge pin spline 700 and a second mating spline portion 712 that couples with the input fitting spline 705. In other aspects, the coupling spline 710 may couple with both the hinge pin spline 700 and the input fitting spline 705 with spline teeth that are common to both the hinge pin spline 700 and the input fitting spline 705. The hinge pin spline 700, the input fitting spline 705 and the coupling spline 710 may be involute splines, square splines (e.g., having substantially parallel sides) or any other suitable spline.

Referring to FIGS. 7A, 8A, 8B, 9A, 9B, 9C, the hinge pin spline 700 is an external spline 809 having teeth 800 with a crowned tooth surface 900. The crowned tooth surface 900 includes one or more of the sides 901, 902 of a respective tooth 800 and a top land or outer/top surface 903 of the respective tooth 800. With respect to the sides 901, 902, the crowned tooth surface 900 is such that, a distance 950 between the sides 901, 902 at longitudinal ends 801, 802 of the respective tooth 800 is less than a distance 951 at a center portion 803 of the respective tooth 800. The difference in the distances 950, 951 is effected by a curvature of the respective sides (see FIG. 8B), where respective sides have a radius 860 of between about 38 inches (about 97 cm) and about 48 inches (about 122 cm). In other aspects, the radius 860 may be more than about 48 inches (about 122 cm) or less than about 38 inches (about 97 cm). It is noted that the differences in tooth thickness effected by the distances 950, 951 may be apparent when measured from a constant/common reference datum (i.e., a location from which all measurements of the tooth are based) of the part on which the teeth are disposed. For example, with respect to the hinge pin spline 700 of hinge pin 600, the difference in the distances 950, 951 and the resulting changes in tooth thickness between the sides 901, 902 (i.e., the tooth growing thicker at its center portion 803 between the longitudinal ends 801, 802) are apparent when the distances 950, 951 are measured from the first longitudinal axis 790 (or a constant/common distance from the first longitudinal axis) of the hinge pin 600, where the first longitudinal axis 790 forms a centerline of the hinge pin 600.

With respect to the outer surface 903 of the respective tooth 800, the crowned tooth surface 900 is such that, a distance 952 between the outer surface 903 and the centerline of the part on which the tooth 800 is disposed (e.g., such as the first longitudinal axis 790 of the hinge pin 600) (see FIG. 9B) at the longitudinal ends 801, 802 of the respective tooth 800 is less than a distance 953 between the outer surface 903 and the first longitudinal axis 790 at the center portion 803 of the respective tooth 800. The difference in the distances 952, 953 is effected by a curvature of the outer surface 903 (see FIG. 9B), where outer surface 903 has a radius 960 of between about 22 inches (about 56 cm) and about 28 inches (about 71 cm). In other aspects, the radius 960 may be more than about 28 inches (about 71 cm) or less than about 22 inches (about 56 cm). The first mating spline portion 711 of the coupling spline 710 has an internal straight-sided spline 811 (e.g., having linear or un-crowned spline teeth 810 with tooth surfaces 810S—FIG. 8A).

Still referring to FIGS. 7A, 8A, 8B, 9A, 9B, 9C, the input fitting spline 705 is an external spline 709 having teeth 770 (FIG. 7B) with a crowned tooth surface 780 (FIGS. 7B and 9A) that is substantially similar to the crowned tooth surface 900 of the hinge pin spline 700 (see FIG. 9A) described above. For example, with respect to the sides 901, 902, the crowned tooth surface 900 is such that, a distance 950 between the sides 901, 902 at longitudinal ends 801, 802 of the respective tooth 770 is less than a distance 951 at a center portion 803 of the respective tooth 770. The difference in the distances 950, 951 is effected by a curvature of the respective sides (see FIG. 8B), where respective sides have a radius 860 of between about 38 inches (about 97 cm) and about 48 inches (about 122 cm). In other aspects, the radius 860 may be more than about 48 inches (about 122 cm) or less than about 38 inches (about 97 cm). Again, with respect to the input fitting spline 705, the difference in the distances 950, 951 and the resulting changes in tooth thickness between the sides 901, 902 (i.e., the tooth growing thicker at its center portion 803 between the longitudinal ends 801, 802) are apparent when the distances 950, 951 are measured from the second longitudinal axis 791 (or a constant/common distance from the second longitudinal axis) of the input fitting 610, where the second longitudinal axis 791 forms a centerline of the input fitting 610.

With respect to the outer surface 903 of the respective tooth 770, the crowned tooth surface 780 is such that, the distance 952 between the outer surface 903 and the second longitudinal axis 791 at the longitudinal ends 801, 802 of the respective tooth 770 is less than a distance 953 between the outer surface 903 and the second longitudinal axis 791 at the center portion 803 of the respective tooth 770. The difference in the distances 952, 953 is effected by a curvature of the outer surface 903 (see FIG. 9A), where outer surface 903 has a radius 960 of between about 22 inches (about 56 cm) and about 28 inches (about 71 cm). In other aspects, the radius 960 may be more than about 28 inches (about 71 cm) or less than about 22 inches (about 56 cm). The second mating spline portion 712 of the coupling spline 710 has an internal straight-sided spline 811 (see FIGS. 8A and 8B—e.g., having linear or un-crowned spline teeth 810). It is noted that where the spline coupling member 620 includes a crowned spline, the crowned spline of the spline coupling member 620 is substantially similar to that described above with respect to the input fitting 610 and the hinge pin 600.

With respect to the relationship between the radius 860 and the radius 960 of the input fitting 610, the hinge pin 600, and the spline coupling member 620, the crowned spline has constant profile teeth, where each tooth follows a curved path 910 having the radius 960. As a result of each tooth following the curved path 910 having the radius 960, the crowned sides 901, 902 have an effective radius 860 when that radius 860 is measured from the reference datum described above.

Referring to FIG. 7C, in another aspect, the hinge pin spline 700 is an external spline having teeth 800 with a crowned tooth surface 900 as described above. In this aspect, the input fitting spline 705A is an internal straight-sided spline 709A having straight un-crowned teeth 810A (substantially similar to teeth 810 described herein with tooth surfaces 810S). The first mating spline portion 711 of the coupling spline 710 is as described above however, the second mating spline portion 712A has teeth 775, each having a crowned tooth surface 785 that is substantially similar to crowned tooth surfaces 780, 900.

Referring also to FIGS. 10A and 10B, the respective crowned tooth surfaces 780, 900 of each of the hinge pin spline 700 and the input fitting spline 705 form respective universal joints 1020, 1021 (e.g., splined universal joints) with the coupling spline 710. In aspects, such as in FIG. 7C, where crowned tooth surface 785 is employed, the crowned tooth surface 785 also forms a universal joint 1022 with the coupling spline 710 substantially similar to universal joints 1020, 1021. The universal joint 1020, 1021, 1022 (e.g., splined universal joint) as used herein is a joint that provides two degree of freedom pivoting motion in directions 798, 799 (see FIG. 7B) between two shafts (e.g., such as between the hinge pin 600 and the spline coupling member 620 and between the spline coupling member 620 and the input fitting 610) while also providing a splined coupling between the shafts. For example, the crowned tooth surfaces 780, 785, 900, as described above, provide increasing clearance between each of the hinge pin spline 700 and the input fitting spline 705 with a respective one of the first mating spline portion 711 and the second mating spline portion 712 of the coupling spline 710, where the clearance increases from the center portion 803 of the teeth 770, 775, 800 towards the longitudinal ends 801, 802 of the teeth 770, 800. This clearance provides for relative pivoting movement between the hinge pin spline 700 and the first mating spline portion 711 about a contact area 840 (FIG. 8B—shown with respect to teeth 800 for illustrative purposes only noting a similar contact area is provided with teeth 770, 775) formed between the crowned sides 901, 902 of the teeth 770, 775, 800 and mating spline tooth surfaces 850, 851.

Referring to FIGS. 5, 6A, 7A, and 7B, at least one hinge pin bushing 760, 761 (see in FIG. 7A with respect to hinge pin 600, noting similar hinge pin bushings may be provided for hinge pins 601, 602) is coupled to at least one of the fixed wing portion 204 and the folding wing portion 202. In FIG. 7A, hinge pin bushing 760 is coupled to the fixed wing portion 204 and hinge pin bushing 761 is coupled to the folding wing portion 202. The hinge pin 600 extends through the at least one hinge pin bushing 760, 761 so that the hinge pin 600 is supported by the at least one hinge pin bushing 760, 761 about a third longitudinal axis 792 of the at least one hinge pin bushing 760, 761. The first longitudinal axis 790 moves relative to the third longitudinal axis 792 by a second predetermined amount of movement 740 (shown as a linear distance in FIG. 7A but may be a linear rotation in addition to or in lieu of the linear distance). The second predetermined amount of movement 740 is less than the first predetermined amount of movement 1000 so that flight loads 720 between the fixed wing portion 204 and the folding wing portion 202 are substantially isolated to a load path 721 that passes through the at least one hinge pin bushing 760. The coupling between the spline coupling member 620 and both of the hinge pin 600 and input fitting 610 is configured to decouple the flight loads 720 between the fixed wing portion 204 and the folding wing portion 202 (e.g., substantially prevents flight loads from passing through the hinge pin spline 700, the input fitting spline 705 and the coupling spline 710).

As illustrated in FIGS. 10A and 10B, the splined coupling (e.g., crowned spline coupling) between the hinge pin 600 and the spline coupling member 620 provides for axial misalignment between the hinge pin 600 and the spline coupling member 620 such that the first longitudinal axis 790 and a coupling member longitudinal axis 793 can pivot relative to one another in directions 798, 799 (FIG. 7B). Similarly, the splined coupling (e.g., crowned spline coupling) between the input fitting 610 and the spline coupling member 620 provides for axial misalignment between the input fitting 610 and the spline coupling member 620 such that the second longitudinal axis 791 and the coupling member longitudinal axis 793 can pivot relative to one another in directions 798, 799 (FIG. 7B). Here, two sets of crowned spline couplings (e.g., the first set between the input fitting 610 and the spline coupling member 620 and the second set between the spline coupling member 620 and the hinge pin 600) provides for "floating" of the hinge pin 600 relative to the input fitting 610.

The crowned spline couplings provide for a greater amount of movement (e.g. translation in directions 798, 799) between the hinge pin 600 and the input fitting 610 than allowed between the at least one hinge pin bushing 760, 761 and the hinge pin 600 such that contact is made between the hinge pin 600 and the at least one hinge pin bushing 760, 761 before the crowned spline couplings reach their limits of motion thereby decoupling (e.g., isolating) the torsional loads 750 transmitted through the crowned spline couplings for folding/unfolding the folding wing portion 202 from the flight loads 720. The crowned splined couplings as described herein may also ease manufacturing tolerances because the relative movement between the hinge pin 600 and the input fitting 610 provides for relaxed position accuracy when locating the input fitting relative to the hinge axis 206 (which may be defined by, e.g., the third longitudinal axis 792 of the hinge pin bushings at least one hinge pin bushing 760, 761).

To substantially prevent movement of the spline coupling member 620 along the first longitudinal axis 790 and/or second longitudinal axis 791, the hinge pin 600 includes a first protrusion 733 (FIGS. 7A and 7C) configured to prevent longitudinal movement of the spline coupling member 620 relative to the hinge pin 600 in a first longitudinal direction 789. The input fitting 610 includes a second protrusion 734 (FIGS. 7A and 7C) configured to prevent longitudinal movement of the spline coupling member 620 relative to the hinge pin 600 in a second longitudinal direction 788, the second longitudinal direction 788 being opposite the first longitudinal direction 789.

As described above, rotary actuator 530 is coupled to the hinge pin 600 to effect folding and unfolding of the folding wing portion 202 relative to the fixed wing portion 204. The coupling between the rotary actuator and the hinge pin 600 may be any suitable coupling such as a spline coupling 730. While the input fitting 610 is coupled to one of the fixed wing portion 204 and the folding wing portion 202, the rotary actuator 530 is coupled to another of the fixed wing portion 204 and the folding wing portion 202 (e.g., where the input fitting 610 is coupled to the fixed wing portion 204 the rotary actuator 530 is coupled to the folding wing portion 202 and where input fitting 610 is coupled to the folding wing portion 202 the rotary actuator 530 is coupled to the fixed wing portion 204) so as to provide relative rotation between the hinge pin 600 and the rotary actuator 530.

Referring also to FIG. 11, in addition to (or in lieu of) the crowned splined couplings describe above, the folding wing hinge 210 may be provided with additional features that may provide for movement of one or more of the hinge pin 600 and the input fitting 610 relative to the at least one hinge pin bushing 760, 761 for decoupling the flight loads 720 (FIG. 7A) and the torsional loads 750 (FIG. 7B) such that the flight loads are directed through the load path 721 (FIG. 7A) rather than through the splined coupling between the hinge pin 600 and the input fitting 610. In one aspect, the input fitting 610 is coupled to the one of the fixed wing portion 204 and the folding wing portion 202 with a coupling 1100 that effects relative movement (e.g., in directions 798, 799—FIG. 7B) between the input fitting 610 and the one of the fixed wing portion 204 and the folding wing portion 202 so that the flight loads 720 (FIG. 7A) between the fixed wing portion 204 and the folding wing portion 202 are substantially isolated to the load path 721 (FIG. 7A) that passes through the at least one hinge pin bushing 760, 761 coupled to at least one of the fixed wing portion 204 and the folding wing portion 202, wherein the hinge pin 600 extends through the at least one hinge pin bushing 760, 761. For example, the input fitting 610 and/or one of the fixed wing portion 204 and the folding wing portion 202 may have a fastener aperture 1150 that is larger than a diameter of a fastener 1155 coupling the input fitting 610 to the one of the fixed wing portion 204 and the folding wing portion 202. The fastener aperture 1150 may be sized relative to the fastener 1155 and/or the fastener 1155 may be tightened to a predetermined torque specification that provides for relative movement between the input fitting 610 and the one of the fixed wing portion 204 and the folding wing portion 202 where the relative movement is greater than the second predetermined amount of movement 740 between the hinge pin 600 and the at least one hinge pin bushing 760, 761 so that the first longitudinal axis 790 of the hinge pin 600 moves relative to the third longitudinal axis 792 of the at least one hinge pin bushing 760, 761 to substantially isolate the flight loads 720 between the fixed wing portion 204 and the folding wing portion 202 to the load path 721 that passes through the at least one hinge pin bushing 760, 761.

Still referring to FIG. 11, in another aspect, the input fitting 610 includes a flanged end 611 and a free end 612, where the flanged end 611 and the free end 612 are separated by a longitudinal length 613 that effects deflection of the free end 612 under flight loads 720 relative to the flanged end 611 so that the first longitudinal axis 790 of the hinge pin 600 moves relative to the third longitudinal axis 792 of the at least one hinge pin bushing 760, 761 to substantially isolate the flight loads 720 between the fixed wing portion 204 and the folding wing portion 202 to the load path 721 that passes through the at least one hinge pin bushing 760, 761. In still other aspects, a tooth-to-tooth interface 1170 of one or more of the hinge pin spline 700 and the input fitting spline 705, 705A with the coupling spline 710 effects a third predetermined amount of movement 1120 (FIG. 11) between teeth of the coupling spline 710 and teeth of one or more of the hinge pin spline 700 and the input fitting spline 705, 705A. Here, the second predetermined amount of movement 740 is less than the third predetermined amount of movement 1120 so that the flight loads 720 (FIG. 7A) between the fixed wing portion 204 and the folding wing portion 202 are substantially isolated to the load path 721 that passes through the at least one hinge pin bushing 760, 761. For example, clearance 1121 (corresponding to the third predetermined amount of movement 1120) may be provided between the teeth 1131 (which may be straight teeth or crowned teeth as described above) of the input fitting spline 1130 (which may be an internal or external spline, where an internal spline is illustrated in FIG. 11 for exemplary purposes only) and the teeth 1141 (which may be straight teeth or crowned teeth as described above) of the hinge pin spline 1140 (which may be an internal or external spline, where an external spline is illustrated in FIG. 11 for exemplary purposes only). Here the clearance 1121 may be greater than the second predetermined amount of movement 740 between the hinge pin 600 and the at least one hinge pin bushing 760, 761 so that the first longitudinal axis 790 of the hinge pin 600 moves relative to the third longitudinal axis 792 of the at least one hinge pin bushing 760, 761 to substantially isolate the flight loads 720 between the fixed wing portion 204 and the folding wing portion 202 to the load path 721 that passes through the at least one hinge pin bushing 760, 761.

Referring now to at least FIGS. 1, 5, 6A, 6B, 6C, 7A, 7B, 7C, and 12, an exemplary method for substantially isolating flight loads 720 in the folding wing hinge 210 will be described. The method includes providing an input fitting 610 that is coupled to one of a fixed wing portion 204 and a folding wing portion 202 of a wing 120 (FIG. 12, Block 1200), wherein the input fitting 610 includes an input fitting spline 705, 705A coupled with a hinge pin spline 700 of a hinge pin 600. Relative movement is effected between a first longitudinal axis 790 of the hinge pin 600 and a second longitudinal axis 791 of the input fitting 610 with a spline coupling member 620 having a coupling spline 710 configured to couple with the hinge pin spline 700 and the input fitting spline 705, 705A so that the first longitudinal axis 790 moves relative to the second longitudinal axis 791 by a first predetermined amount of movement 1000 (FIG. 10B).

The flight loads 720 between the fixed wing portion 204 and the folding wing portion 202 are substantially isolated to the load path 721 that passes through at least one hinge pin bushing 760, 761 coupled to at least one of the fixed wing portion 204 and the folding wing portion 202 (FIG. 12, Block 1220). For example, the at least one hinge pin bushing 760, 761 has a third longitudinal axis 792 and the first longitudinal axis 790 of the hinge pin 600 moves relative to the third longitudinal axis 792 by the second predetermined amount of movement 740. In another example, relative movement between the input fitting 610 and the one of the fixed wing portion 204 and the folding wing portion 202 is effected so that flight loads 720 between the fixed wing portion 204 and the folding wing portion 202 are substantially isolated to the load path 721 that passes through at least one hinge pin bushing 760, 761 coupled to at least one of the fixed wing portion 204 and the folding wing portion 202, where the hinge pin 600 extends through the at least one hinge pin bushing 760, 761. In one aspect, the flight loads 720 are decoupled between the fixed wing portion 204 and the folding wing portion 202 with the coupling between the spline coupling member 620 and both of the hinge pin 600 and input fitting 610 (FIG. 12, Block 1230). In another aspect, deflection of the free end 612 of the input fitting 610 is effected relative to the flanged end 611 of the input fitting 610 (FIG. 12, Block 1250) with the longitudinal length 613 of the input fitting 610 so that the first longitudinal axis 790 of the hinge pin 600 moves relative to the third longitudinal axis 792 of the at least one hinge pin bushing 760, 761 to substantially isolate flight loads 720 between the fixed wing portion 204 and the folding wing portion 202 to the load path 721

The method may also include preventing longitudinal movement of the spline coupling member 620 relative to the hinge pin 600 in the first longitudinal direction 789 with the first protrusion 733 of the hinge pin 600. Longitudinal movement of the spline coupling member 620 relative to the hinge pin 600 may also be prevented in the second longitudinal direction 788, the second longitudinal direction 788 being opposite the first longitudinal direction 789, with the second protrusion 734 of the input fitting 610.

The method may also include effecting the third predetermined amount of movement 1120 (FIG. 11), with a tooth-to-tooth interface 1170 of one or more of the hinge pin spline 700 and the input fitting spline 705, 705A with the coupling spline 710, between teeth of the coupling spline 710 and teeth of the one or more of the hinge pin spline 700 and the input fitting spline 705, 705A, wherein the second predetermined amount of movement 740 between the hinge pin 600 and at least one hinge pin bushing 760, 761 coupled to at least one of the fixed wing portion 204 and the folding wing portion 202 is less than the third predetermined amount of movement 1120 so that flight loads 720 between the fixed wing portion 204 and the folding wing portion 202 are substantially isolated to the load path 721.

The following examples are provided in accordance with the aspects of the present disclosure:

A1. A folding wing hinge for a wing having a fixed wing portion and a folding wing portion, the folding wing hinge comprising:
a hinge pin including a hinge pin spline and having a first longitudinal axis;
an input fitting coupled to one of the fixed wing portion and the folding wing portion, the input fitting including an input fitting spline and a second longitudinal axis; and
a spline coupling member having a coupling spline configured to couple with the hinge pin spline and the input fitting spline so that the first longitudinal axis moves relative to the second longitudinal axis by a first predetermined amount of movement.

A2. The folding wing hinge of paragraph A1, further comprising:
at least one hinge pin bushing coupled to at least one of the fixed wing portion and the folding wing portion, the at least one hinge pin bushing having a third longitudinal axis;
wherein the hinge pin extends through the at least one hinge pin bushing; and
wherein the first longitudinal axis moves relative to the third longitudinal axis by a second predetermined amount of movement, the second predetermined amount of movement being less than the first predetermined amount of movement so that flight loads between the fixed wing portion and the folding wing portion are substantially isolated to a load path that passes through the at least one hinge pin bushing.

A3. The folding wing hinge of paragraph A1, further comprising:
a rotary actuator coupled to another of the fixed wing portion and the folding wing portion, the rotary actuator being coupled to the hinge pin to effect folding and unfolding of the folding wing portion relative to the fixed wing portion.

A4. The folding wing hinge of paragraph A1, wherein:
the hinge pin spline is an external spline having teeth with a crowned tooth surface; and
the coupling spline includes a first mating spline portion having an internal straight-sided spline.

A5. The folding wing hinge of paragraph A4, wherein:
the input fitting spline is an external spline having teeth with a crowned tooth surface; and
the coupling spline includes a second mating spline portion having an internal straight-sided spline.

A6. The folding wing hinge of paragraph A5, wherein the respective crowned tooth surfaces of the hinge pin spline and the input fitting spline have a radius of between about 22 inches and about 28 inches.

A7. The folding wing hinge of paragraph A5, wherein the respective crowned tooth surfaces of each of the hinge pin spline and the input fitting spline form respective universal joints with the coupling spline.

A8. The folding wing hinge of paragraph A4, wherein:
the input fitting spline is an internal straight-sided spline; and
the coupling spline includes a second mating spline portion having teeth with a crowned tooth surface.

A9. The folding wing hinge of paragraph A8, wherein the crowned tooth surface of the teeth of the second mating spline portion has a radius of between about 22 inches and about 28 inches.

A10. The folding wing hinge of paragraph A8, wherein respective crowned tooth surfaces of the hinge pin spline and tooth surfaces of the input fitting spline form respective universal joints with the coupling spline.

A11. The folding wing hinge of paragraph A4, wherein the crowned tooth surface of the teeth of the hinge pin spline has a radius of between about 22 inches and about 28 inches.

A12. The folding wing hinge of paragraph A1, wherein the coupling between the spline coupling member and both of the hinge pin and input fitting is configured to substantially prevent flight loads from being transmitted between the fixed wing portion and the folding wing portion through the hinge pin spline, the input fitting spline, and the coupling spline.

A13. The folding wing hinge of paragraph A1, wherein the hinge pin includes a first protrusion configured to prevent longitudinal movement of the spline coupling member relative to the hinge pin in a first longitudinal direction.

A14. The folding wing hinge of paragraph A13, wherein the input fitting includes a second protrusion configured to prevent longitudinal movement of the spline coupling member relative to the hinge pin in a second longitudinal direction, the second longitudinal direction being opposite the first longitudinal direction.

A15. The folding wing hinge of paragraph A1, wherein one or more of the hinge pin spline, the input fitting spline and the coupling spline is an involute spline.

A16. The folding wing hinge of paragraph A1, wherein one or more of the hinge pin spline, the input fitting spline and the coupling spline is a square spline.

A17. The folding wing hinge of paragraph A1, wherein the input fitting is coupled to the one of the fixed wing portion and the folding wing portion with a coupling that effects relative movement between the input fitting and the one of the fixed wing portion and the folding wing portion so that flight loads between the fixed wing portion and the folding wing portion are substantially isolated to a load path that passes through at least one hinge pin bushing coupled to at least one of the fixed wing portion and the folding wing portion, wherein the hinge pin extends through the at least one hinge pin bushing.

A18. The folding wing hinge of paragraph A1, further comprising:

at least one hinge pin bushing coupled to at least one of the fixed wing portion and the folding wing portion, the at least one hinge pin bushing having a third longitudinal axis; and wherein the hinge pin extends through the at least one hinge pin bushing, wherein the first longitudinal axis of the hinge pin moves relative to the third longitudinal axis by a second predetermined amount of movement, and a tooth-to-tooth interface of one or more of the hinge pin spline and the input fitting spline with the coupling spline effects a third predetermined amount of movement between teeth of the coupling spline and teeth of the one or more of the hinge pin spline and the input fitting spline, the second predetermined amount of movement being less than the third predetermined amount of movement so that flight loads between the fixed wing portion and the folding wing portion are substantially isolated to a load path that passes through the at least one hinge pin bushing.

A19. The folding wing hinge of paragraph A1, further comprising:

at least one hinge pin bushing coupled to at least one of the fixed wing portion and the folding wing portion, the at least one hinge pin bushing having a third longitudinal axis; and wherein the hinge pin extends through the at least one hinge pin bushing, and the input fitting includes a flanged end and a free end, the flanged end and the free end being separated by a longitudinal length that effects deflection of the free end, under flight loads, relative to the flanged end so that the first longitudinal axis of the hinge pin moves relative to the third longitudinal axis to substantially isolate flight loads between the fixed wing portion and the folding wing portion to a load path that passes through the at least one hinge pin bushing.

A20. The folding wing hinge of paragraph A5, wherein the respective crowned tooth surfaces of the hinge pin spline and the input fitting spline have a radius of between about 38 inches and about 48 inches.

A21. The folding wing hinge of paragraph A8, wherein the crowned tooth surface of the teeth of the second mating spline portion has a radius of between about 38 inches and about 48 inches.

A22. The folding wing hinge of paragraph A4, wherein the crowned tooth surface of the teeth of the hinge pin spline has a radius of between about 38 inches and about 48 inches.

B1. An aircraft comprising:

a wing having a fixed wing portion and a folding wing portion; and a folding wing hinge including a hinge pin rotatably coupling the folding wing portion to the fixed wing portion, the hinge pin including a hinge pin spline and having a first longitudinal axis, an input fitting coupled to one of the fixed wing portion and the folding wing portion, the input fitting including an input fitting spline and a second longitudinal axis, and a spline coupling member having a coupling spline configured to couple with the hinge pin spline and the input fitting spline so that the first longitudinal axis moves relative to the second longitudinal axis by a first predetermined amount of movement.

B2. The aircraft of paragraph B1, wherein the folding wing hinge further includes:

at least one hinge pin bushing coupled to at least one of the fixed wing portion and the folding wing portion, the at least one hinge pin bushing having a third longitudinal axis;

wherein the hinge pin extends through the at least one hinge pin bushing; and wherein the first longitudinal axis of the hinge pin moves relative to the third longitudinal axis by a second predetermined amount of movement, the second predetermined amount of movement being less than the first predetermined amount of movement so that flight loads between the fixed wing portion and the folding wing portion are substantially isolated to a load path that passes through the at least one hinge pin bushing.

B3. The aircraft of paragraph B1, wherein the folding wing hinge further includes:

a rotary actuator coupled to another of the fixed wing portion and the folding wing portion, the rotary actuator being coupled to the hinge pin to effect folding and unfolding of the folding wing portion relative to the fixed wing portion.

B4. The aircraft of paragraph B 1, wherein:

the hinge pin spline is an external spline having teeth with a crowned tooth surface; and the coupling spline includes a first mating spline portion having an internal straight-sided spline.

B5. The aircraft of paragraph B4, wherein:

the input fitting spline is an external spline having teeth with a crowned tooth surface; and the coupling spline includes a second mating spline portion having an internal straight-sided spline.

B6. The aircraft of paragraph B5, wherein the respective crowned tooth surfaces of the hinge pin spline and the input fitting spline have a radius of between about 22 inches and about 28 inches.

B7. The aircraft of paragraph B5, wherein the respective crowned tooth surfaces of each of the hinge pin spline and the input fitting spline form a universal joint with the coupling spline.

B8. The aircraft of paragraph B4, wherein:

the input fitting spline is an internal straight-sided spline; and the coupling spline includes a second mating spline portion having teeth with a crowned tooth surface.

B9. The aircraft of paragraph B8, wherein the crowned tooth surface of the teeth of the second mating spline portion has a radius of between about 22 inches and about 28 inches.

B10. The folding wing hinge of paragraph B8, wherein respective crowned tooth surfaces of the hinge pin spline and tooth surfaces of the input fitting spline form respective universal joints with the coupling spline.

B11. The aircraft of paragraph B4, wherein the crowned tooth surface of the teeth of the hinge pin spline has a radius of between about 22 inches and about 28 inches.

B12. The aircraft of paragraph B1, wherein the coupling between the spline coupling member and both of the hinge pin and input fitting is configured to substantially prevent flight loads from being transmitted between the fixed wing portion and the folding wing portion through the hinge pin spline, the input fitting spline, and the coupling spline.

B13. The aircraft of paragraph B1, wherein the hinge pin includes a first protrusion configured to prevent longitudinal movement of the spline coupling member relative to the hinge pin in a first longitudinal direction.

B14. The aircraft of paragraph B13, wherein the input fitting includes a second protrusion configured to prevent longitudinal movement of the spline coupling member relative to the hinge pin in a second longitudinal direction, the second longitudinal direction being opposite the first longitudinal direction.

B15. The aircraft of paragraph B1, wherein one or more of the hinge pin spline, the input fitting spline and the coupling spline is an involute spline.

B16. The aircraft of paragraph B1, wherein one or more of the hinge pin spline, the input fitting spline and the coupling spline is a square spline.

B17. The aircraft of paragraph B1, wherein the first longitudinal axis is substantially parallel with a fuselage of the aircraft.

B18. The aircraft of paragraph B1, wherein the first longitudinal axis of the hinge pin is substantially perpendicular to at least one spar of the fixed wing portion.

B19. The aircraft of paragraph B1, wherein the input fitting is coupled to the one of the fixed wing portion and the folding wing portion with a coupling that effects relative movement between the input fitting and the one of the fixed wing portion and the folding wing portion so that flight loads between the fixed wing portion and the folding wing portion are substantially isolated to a load path that passes through at least one hinge pin bushing coupled to at least one of the fixed wing portion and the folding wing portion, wherein the hinge pin extends through the at least one hinge pin bushing.

B20. The aircraft of paragraph B1, further comprising:
at least one hinge pin bushing coupled to at least one of the fixed wing portion and the folding wing portion, the at least one hinge pin bushing having a third longitudinal axis; and
wherein
the hinge pin extends through the at least one hinge pin bushing, wherein the first longitudinal axis of the hinge pin moves relative to the third longitudinal axis by a second predetermined amount of movement, and
a tooth-to-tooth interface of one or more of the hinge pin spline and the input fitting spline with the coupling spline effects a third predetermined amount of movement between teeth of the coupling spline and teeth of the one or more of the hinge pin spline and the input fitting spline, the second predetermined amount of movement being less than the third predetermined amount of movement so that flight loads between the fixed wing portion and the folding wing portion are substantially isolated to a load path that passes through the at least one hinge pin bushing.

B21. The aircraft of paragraph B1, further comprising:
at least one hinge pin bushing coupled to at least one of the fixed wing portion and the folding wing portion, the at least one hinge pin bushing having a third longitudinal axis; and
wherein
the hinge pin extends through the at least one hinge pin bushing, and the input fitting includes a flanged end and a free end, the flanged end and the free end being separated by a longitudinal length that effects deflection of the free end, under flight loads, relative to the flanged end so that the first longitudinal axis of the hinge pin moves relative to the third longitudinal axis to substantially isolate flight loads between the fixed wing portion and the folding wing portion to a load path that passes through the at least one hinge pin bushing.

B22. The aircraft of paragraph B5, wherein the respective crowned tooth surfaces of the hinge pin spline and the input fitting spline have a radius of between about 38 inches and about 48 inches.

B23. The aircraft of paragraph B8, wherein the crowned tooth surface of the teeth of the second mating spline portion has a radius of between about 38 inches and about 48 inches.

B24. The aircraft of paragraph B4, wherein the crowned tooth surface of the teeth of the hinge pin spline has a radius of between about 38 inches and about 48 inches.

C1. A method for substantially isolating flight loads in a folding wing hinge, the method comprising:
providing an input fitting that is coupled to one of a fixed wing portion and a folding wing portion of a wing, wherein the input fitting includes an input fitting spline coupled with a hinge pin spline of a hinge pin; and
effecting relative movement between a first longitudinal axis of the hinge pin and a second longitudinal axis of the input fitting with a spline coupling member having a coupling spline configured to couple with the hinge pin spline and the input fitting spline so that the first longitudinal axis moves relative to the second longitudinal axis by a first predetermined amount of movement.

C2. The method of paragraph C1, further comprising:
substantially isolating flight loads between the fixed wing portion and the folding wing portion to a load path that passes through at least one hinge pin bushing coupled to at least one of the fixed wing portion and the folding wing portion; and
wherein the at least one hinge pin bushing has a third longitudinal axis, and the hinge pin extends through the at least one hinge pin bushing; and
wherein the first longitudinal axis of the hinge pin moves relative to the third longitudinal axis by a second predetermined amount of movement, the second predetermined amount of movement being less than the first predetermined amount of movement.

C3. The method of paragraph C1, further comprising:
effecting relative movement between a first longitudinal axis of the hinge pin and a second longitudinal axis of the input fitting wherein the hinge pin spline is an external spline having teeth with a crowned tooth surface and the coupling spline includes a first mating spline portion having an internal straight-sided spline.

C4. The method of paragraph C3, further comprising:
effecting relative movement between a first longitudinal axis of the hinge pin and a second longitudinal axis of the input fitting wherein the input fitting spline is an external spline having teeth with a crowned tooth surface, and wherein the coupling spline includes a second mating spline portion having an internal straight-sided spline.

C5. The method of paragraph C3, further comprising:
effecting relative movement between a first longitudinal axis of the hinge pin and a second longitudinal axis of the input fitting wherein the input fitting spline is an internal linear spline and the coupling spline includes a second mating spline portion having teeth with a crowned tooth surface.

C6. The method of paragraph C1, further comprising substantially preventing flight loads from being transmitted between the fixed wing portion and the folding wing portion through the hinge pin spline, the input fitting spline, and the coupling spline with the coupling between the spline coupling member and both of the hinge pin and input fitting.

C7. The method of paragraph C1, further comprising preventing longitudinal movement of the spline coupling member relative to the hinge pin in a first longitudinal direction with a first protrusion of the hinge pin.

C8. The method of paragraph C7, further comprising preventing longitudinal movement of the spline coupling member relative to the hinge pin in a second longitudinal direction, the second longitudinal direction being opposite the first longitudinal direction, with a second protrusion of the input fitting.

C9. The method of paragraph C1, further comprising effecting relative movement between the input fitting and the one of the fixed wing portion and the folding wing portion so that flight loads between the fixed wing portion and the folding wing portion are substantially isolated to a load path that passes through at least one hinge pin bushing coupled to at least one of the fixed wing portion and the folding wing portion, where the hinge pin extends through the at least one hinge pin bushing.

C10. The method of paragraph C1, further comprising effecting a third predetermined amount of movement, with a tooth-to-tooth interface of one or more of the hinge pin spline and the input fitting spline with the coupling spline, between teeth of the coupling spline and teeth of the one or more of the hinge pin spline and the input fitting spline, wherein a second predetermined amount of movement between the hinge pin and at least one hinge pin bushing coupled to at least one of the fixed wing portion and the folding wing portion is less than the third predetermined amount of movement so that flight loads between the fixed wing portion and the folding wing portion are substantially isolated to a load path that passes through the at least one hinge pin bushing.

C11. The method of paragraph C1, further comprising effecting deflection of a free end of the input fitting relative to a flanged end of the input fitting with a longitudinal length of the input fitting separating the free end from the flanged end so that the first longitudinal axis of the hinge pin moves relative to a third longitudinal axis of at least one hinge pin bushing coupled to at least one of the fixed wing portion and the folding wing portion to substantially isolate flight loads between the fixed wing portion and the folding wing portion to a load path that passes through the at least one hinge pin bushing.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIG. 12, referred to above, the blocks may represent operations and/or portions thereof and lines connecting the various blocks do not imply any particular order or dependency of the operations or portions thereof. Blocks represented by dashed lines, if any, indicate alternative operations and/or portions thereof. Dashed lines, if any, connecting the various blocks represent alternative dependencies of the operations or portions thereof. It will be understood that not all dependencies among the various disclosed operations are necessarily represented. FIG. 12 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or substantially simultaneously. Additionally, those skilled in the art will appreciate that not all operations described need be performed.

In the foregoing description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es), system(s), and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A folding wing hinge for a wing having a fixed wing portion and a folding wing portion, the folding wing hinge comprising:
   a hinge pin including a hinge pin spline and having a first longitudinal axis;
   an input fitting coupled to one of the fixed wing portion and the folding wing portion, the input fitting including an input fitting spline and a second longitudinal axis; and
   a spline coupling member having a coupling spline configured to couple with the hinge pin spline and the input fitting spline wherein a splined couple engagement between the coupling spline and the hinge pin spline and another splined couple engagement between the spline coupling member and the input fitting spline each form a respective universal joint that is configured so that the first longitudinal axis moves into and out of alignment relative to the second longitudinal axis by a first predetermined amount of movement.

2. The folding wing hinge of claim 1, further comprising:
   at least one hinge pin bushing coupled to at least one of the fixed wing portion and the folding wing portion, the at least one hinge pin bushing having a third longitudinal axis;
   wherein the hinge pin extends through the at least one hinge pin bushing; and
   wherein the first longitudinal axis moves into and out of alignment relative to the third longitudinal axis by a second predetermined amount of movement, the second predetermined amount of movement being less than the first predetermined amount of movement so that flight loads between the fixed wing portion and the folding wing portion are substantially isolated to a load path that passes through the at least one hinge pin bushing.

3. The folding wing hinge of claim 1, further comprising:
   a rotary actuator coupled to another of the fixed wing portion and the folding wing portion, the rotary actuator being coupled to the hinge pin to effect folding and unfolding of the folding wing portion relative to the fixed wing portion.

4. The folding wing hinge of claim 1, wherein:
   the hinge pin spline is an external spline having teeth with a crowned tooth surface; and
   the coupling spline includes a first mating spline portion having an internal straight-sided spline.

5. The folding wing hinge of claim 4, wherein:
   the input fitting spline is an external spline having teeth with a crowned tooth surface; and
   the coupling spline includes a second mating spline portion having an internal straight-sided spline.

6. The folding wing hinge of claim 5, wherein the respective crowned tooth surfaces of each of the hinge pin spline and the input fitting spline form the respective universal joints with the coupling spline.

7. The folding wing hinge of claim 4, wherein:
   the input fitting spline is an internal straight-sided spline; and
   the coupling spline includes a second mating spline portion having teeth with a crowned tooth surface.

8. The folding wing hinge of claim 7, wherein respective crowned tooth surfaces of the hinge pin spline and tooth surfaces of the input fitting spline form the respective universal joints with the coupling spline.

9. The folding wing hinge of claim 1, wherein the coupling between the spline coupling member and both of the hinge pin and input fitting is configured to substantially prevent flight loads from being transmitted between the fixed wing portion and the folding wing portion through the hinge pin spline, the input fitting spline, and the coupling spline.

10. The folding wing hinge of claim 1, wherein one or more of the hinge pin spline, the input fitting spline and the coupling spline is an involute spline.

11. An aircraft comprising:
    a folding wing having a fixed wing portion and a folding wing portion;
    a folding wing hinge including
       a hinge pin rotatably coupling the folding wing portion to the fixed wing portion, the hinge pin including a hinge pin spline and having a first longitudinal axis,
       an input fitting coupled to one of the fixed wing portion and the folding wing portion, the input fitting including an input fitting spline and a second longitudinal axis, and
       a spline coupling member having a coupling spline configured to couple with the hinge pin spline and the input fitting spline so that the first longitudinal axis moves into and out of alignment relative to the second longitudinal axis by a first predetermined amount of movement;

at least one hinge pin bushing coupled to at least one of the fixed wing portion and the folding wing portion, the at least one hinge pin bushing having a third longitudinal axis;

wherein the hinge pin extends through the at least one hinge pin bushing; and wherein the first longitudinal axis of the hinge pin moves into and out of alignment relative to the third longitudinal axis by a second predetermined amount of movement, the second predetermined amount of movement being less than the first predetermined amount of movement so that flight loads between the fixed wing portion and the folding wing portion are substantially isolated to a load path that passes through the at least one hinge pin bushing.

12. The aircraft of claim 11, wherein the folding wing hinge further includes:

a rotary actuator coupled to another of the fixed wing portion and the folding wing portion, the rotary actuator being coupled to the hinge pin to effect folding and unfolding of the folding wing portion relative to the fixed wing portion.

13. The aircraft of claim 11, wherein the coupling between the spline coupling member and both of the hinge pin and input fitting is configured to substantially prevent flight loads from being transmitted between the fixed wing portion and the folding wing portion through the hinge pin spline, the input fitting spline, and the coupling spline.

14. The aircraft of claim 11, wherein the first longitudinal axis is substantially parallel with a fuselage of the aircraft.

15. The aircraft of claim 11, wherein the first longitudinal axis of the hinge pin is substantially perpendicular to at least one spar of the fixed wing portion.

16. A method for substantially isolating flight loads in a folding wing hinge, the method comprising:

providing an input fitting that is coupled to one of a fixed wing portion and a folding wing portion of a wing, wherein the input fitting includes an input fitting spline coupled with a hinge pin spline of a hinge pin; and effecting relative movement between a first longitudinal axis of the hinge pin and a second longitudinal axis of the input fitting with a spline coupling member having a coupling spline configured to couple with the hinge pin spline and the input fitting spline wherein a splined couple engagement between the coupling spline and the hinge pin spline and another splined couple engagement between the spline coupling member and the input fitting spline each form a respective universal joint that is configured so that the first longitudinal axis moves into and out of alignment relative to the second longitudinal axis by a first predetermined amount of movement.

17. The method of claim 16, further comprising:

substantially isolating flight loads between the fixed wing portion and the folding wing portion to a load path that passes through at least one hinge pin bushing coupled to at least one of the fixed wing portion and the folding wing portion; and wherein the at least one hinge pin bushing has a third longitudinal axis, and the hinge pin extends through the at least one hinge pin bushing; and wherein the first longitudinal axis of the hinge pin moves relative to the third longitudinal axis by a second predetermined amount of movement, the second predetermined amount of movement being less than the first predetermined amount of movement.

18. The method of claim 16, further comprising:

effecting relative movement between a first longitudinal axis of the hinge pin and a second longitudinal axis of the input fitting wherein the hinge pin spline is an external spline having teeth with a crowned tooth surface and the coupling spline includes a first mating spline portion having an internal straight-sided spline.

19. The method of claim 16, further comprising substantially preventing flight loads from being transmitted between the fixed wing portion and the folding wing portion through the hinge pin spline, the input fitting spline, and the coupling spline with the coupling between the spline coupling member and both of the hinge pin and input fitting.

20. The aircraft of claim 11, wherein a splined couple engagement between the coupling spline and the hinge pin spline and another splined couple engagement between the spline coupling member and the input fitting spline each form a respective universal joint.

* * * * *